(12) United States Patent
Lee et al.

(10) Patent No.: US 12,147,653 B2
(45) Date of Patent: Nov. 19, 2024

(54) ELECTRONIC DEVICE AND LAYOUT CONFIGURATION METHOD USING SAME

(71) Applicant: Samsung Electronics Co., Ltd., Suwon-si (KR)

(72) Inventors: Bona Lee, Suwon-si (KR); Kwansuk Yoo, Suwon-si (KR); Sukjae Lee, Suwon-si (KR); Junwon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/828,626

(22) Filed: May 31, 2022

(65) Prior Publication Data

US 2022/0291818 A1 Sep. 15, 2022

Related U.S. Application Data

(63) Continuation of application No. PCT/KR2020/015161, filed on Nov. 2, 2020.

(30) Foreign Application Priority Data

Dec. 11, 2019 (KR) .......................... 10-2019-0164699

(51) Int. Cl.
*G06F 3/048* (2013.01)
*G06F 3/04842* (2022.01)
*G06F 3/04845* (2022.01)

(52) U.S. Cl.
CPC ...... *G06F 3/04845* (2013.01); *G06F 3/04842* (2013.01)

(58) Field of Classification Search
CPC ... G06F 3/04845; G06F 3/04842; G06F 3/048
See application file for complete search history.

(56) References Cited

U.S. PATENT DOCUMENTS 5,838,318 A * 11/1998 Porter .................. G06F 3/0481
715/790
8,452,797 B1 * 5/2013 Paleja .................. G06Q 30/02
707/767

(Continued)

FOREIGN PATENT DOCUMENTS

KR 10-2015-0032965 A 4/2015
KR 10-2015-0106693 A 9/2015

(Continued)

OTHER PUBLICATIONS

Korean Office Action with English translation dated Sep. 13, 2024; Korean Appln. No. 10-2019-0164699.

*Primary Examiner* — Mahelet Shiberou
(74) *Attorney, Agent, or Firm* — Jefferson IP Law, LLP

(57) ABSTRACT

An electronic device is provided. The electronic device includes a display, a memory, and a processor operatively connected to the display and the memory, wherein the processor may be configured to display a screen composed of a plurality of windows corresponding to a plurality of applications on the display, detect an event for changing a layout of the plurality of windows, in response to the detection of the event, display, on the display, a plurality of recommended layouts in which the plurality of windows are arranged differently on the basis of an attribute of each of the plurality of applications and a state of the electronic device, and when one of the plurality of recommended layouts is selected, display, on the display, the plurality of windows to which the selected recommended layout is applied.

16 Claims, 24 Drawing Sheets

(56) References Cited

U.S. PATENT DOCUMENTS

| | | | |
|---|---|---|---|
| 9,483,172 B2* | 11/2016 | Urawaki | G09G 5/14 |
| 9,996,212 B2* | 6/2018 | Sun | G06F 3/0481 |
| 10,459,628 B2 | 10/2019 | Lee et al. | |
| 10,706,199 B1* | 7/2020 | Yan | G06F 3/04842 |
| 2011/0004839 A1* | 1/2011 | Cha | G06F 9/451 |
| | | | 715/765 |
| 2013/0215041 A1 | 8/2013 | Kim et al. | |
| 2013/0227469 A1* | 8/2013 | Park | G06F 9/451 |
| | | | 715/788 |
| 2014/0253801 A1 | 9/2014 | Richman et al. | |
| 2015/0261392 A1 | 9/2015 | Son | |
| 2016/0157822 A1* | 6/2016 | Jin | A61B 8/14 |
| | | | 600/443 |
| 2019/0377459 A1 | 12/2019 | Jeong et al. | |
| 2020/0278720 A1 | 9/2020 | Kim et al. | |
| 2021/0132779 A1 | 5/2021 | Jeong et al. | |

FOREIGN PATENT DOCUMENTS

| | | |
|---|---|---|
| KR | 10-2016-0026141 A | 3/2016 |
| KR | 10-2017-0058152 A | 5/2017 |
| KR | 10-2019-0031870 A | 3/2019 |

* cited by examiner

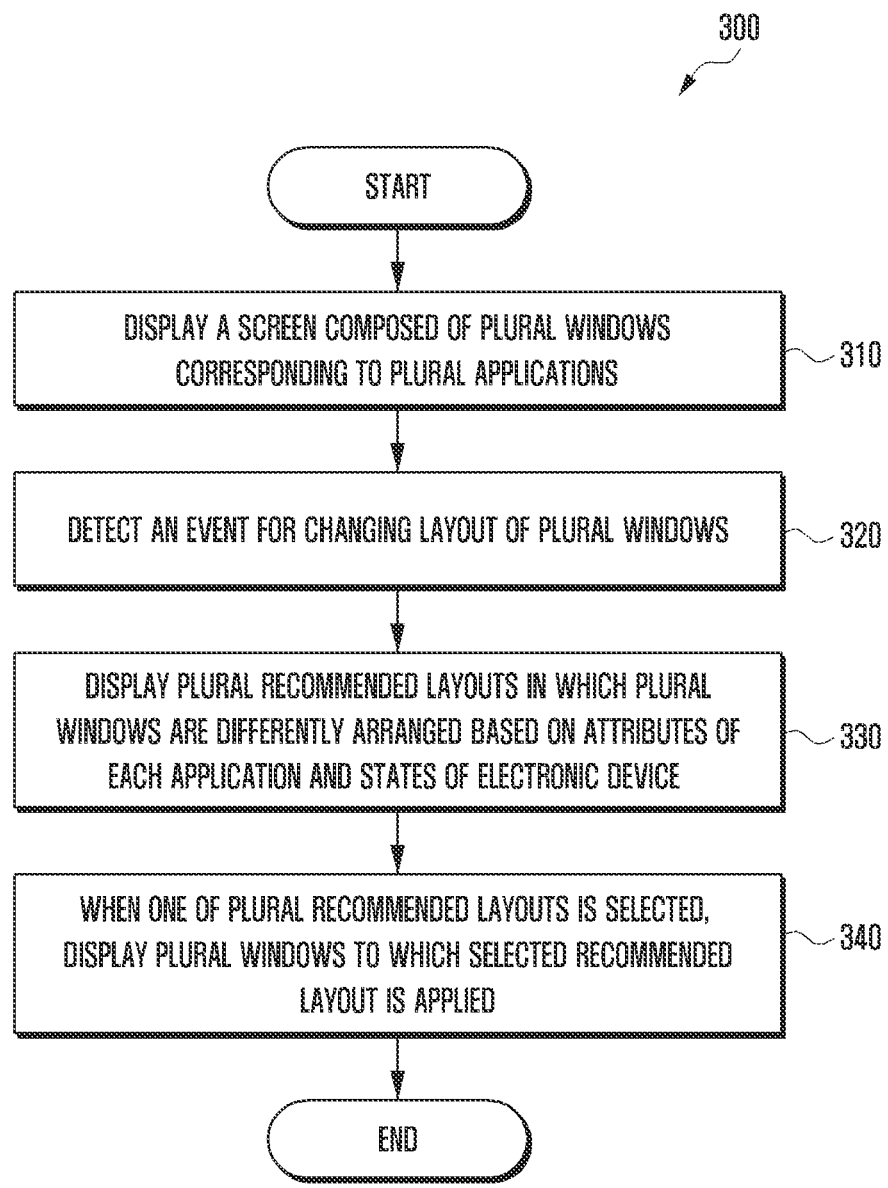

FIG. 4C
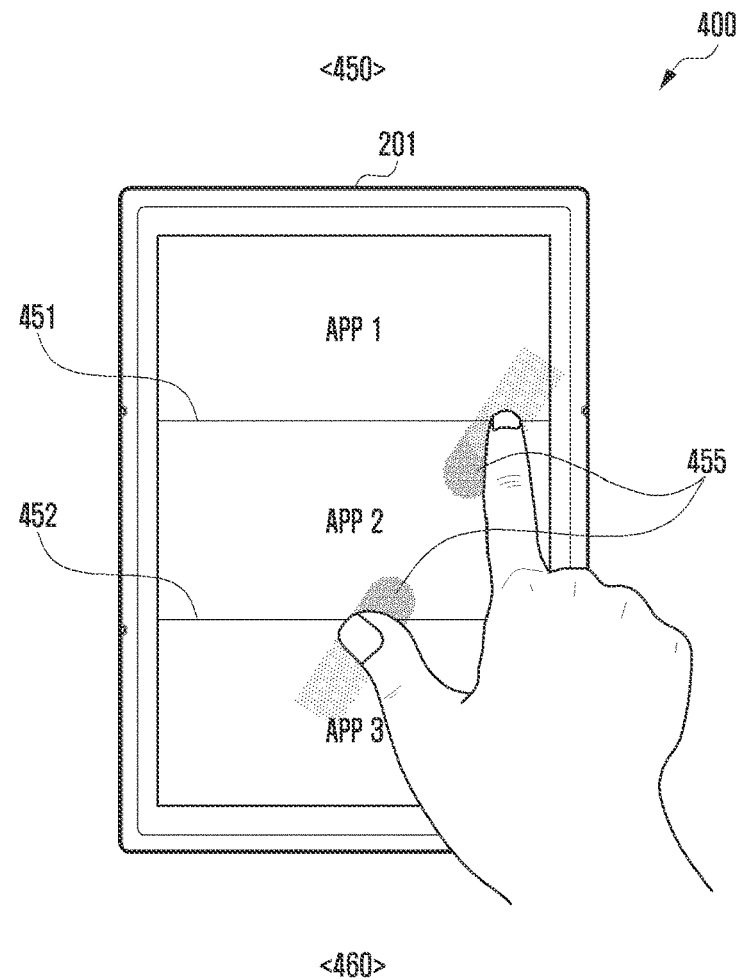
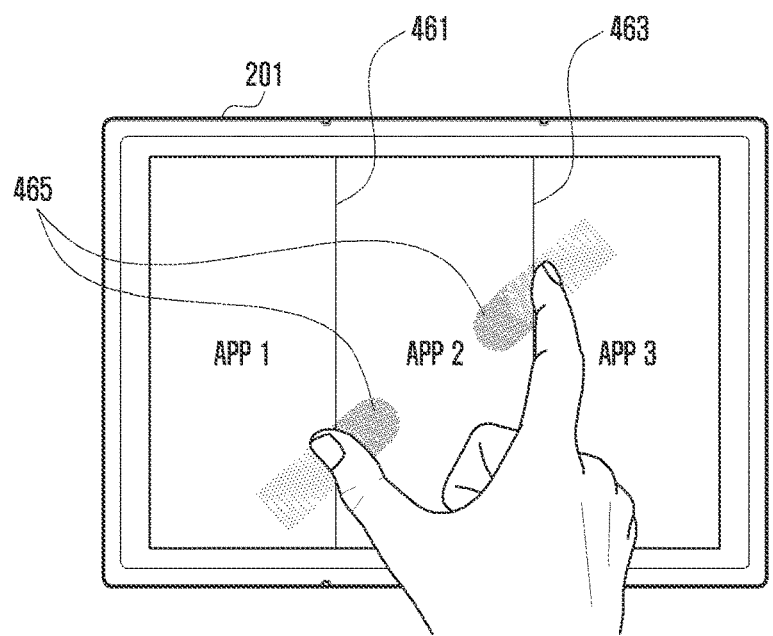

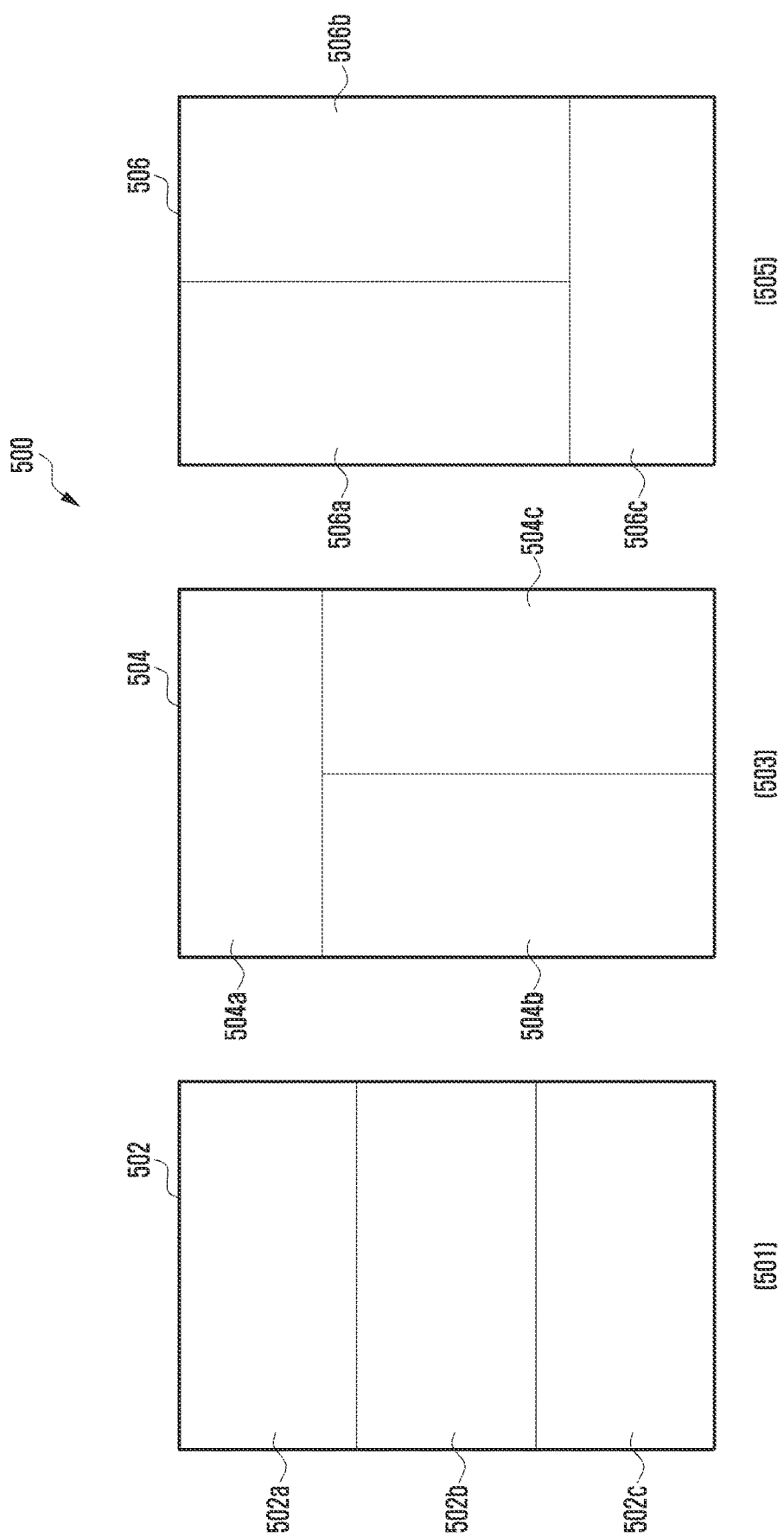

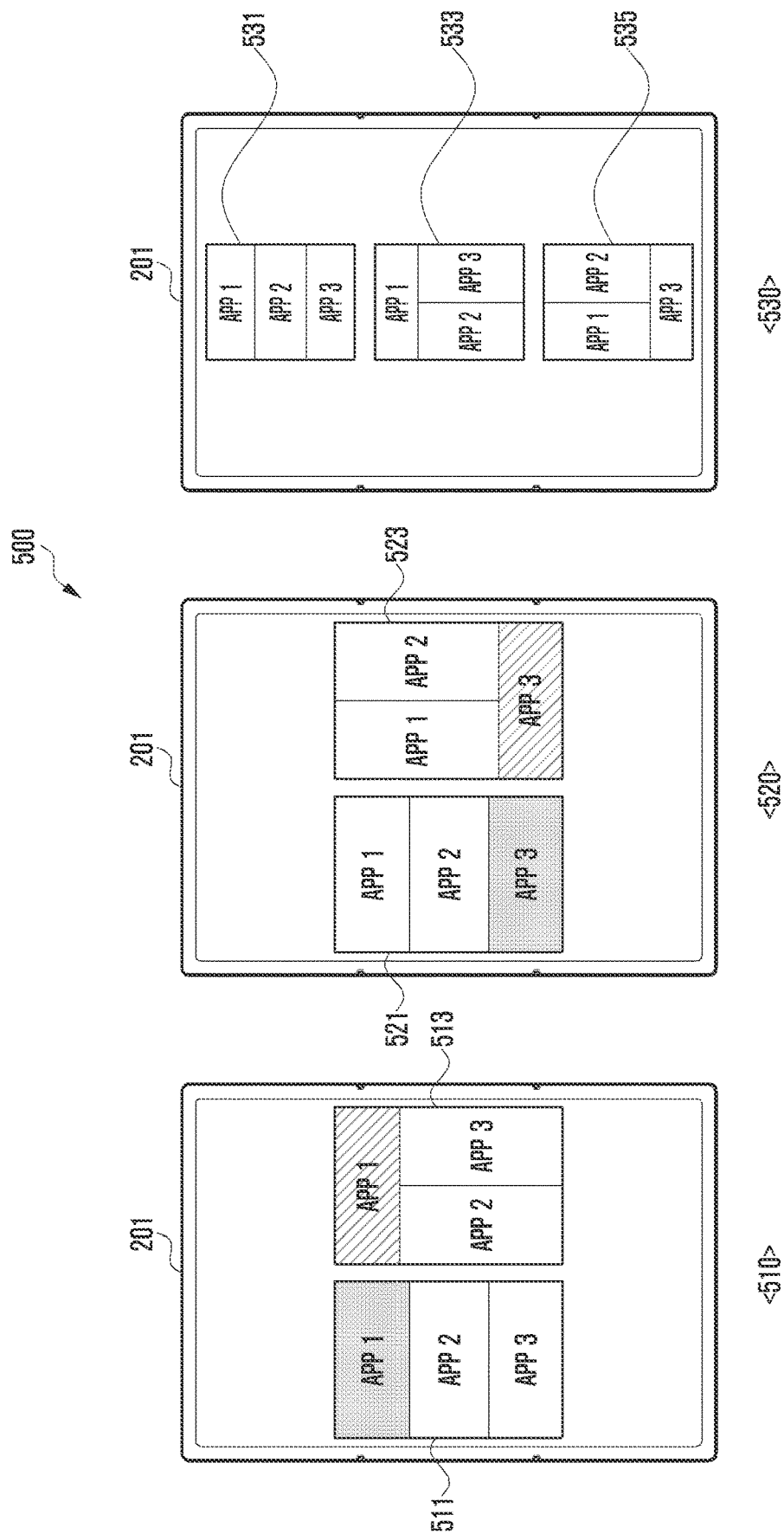

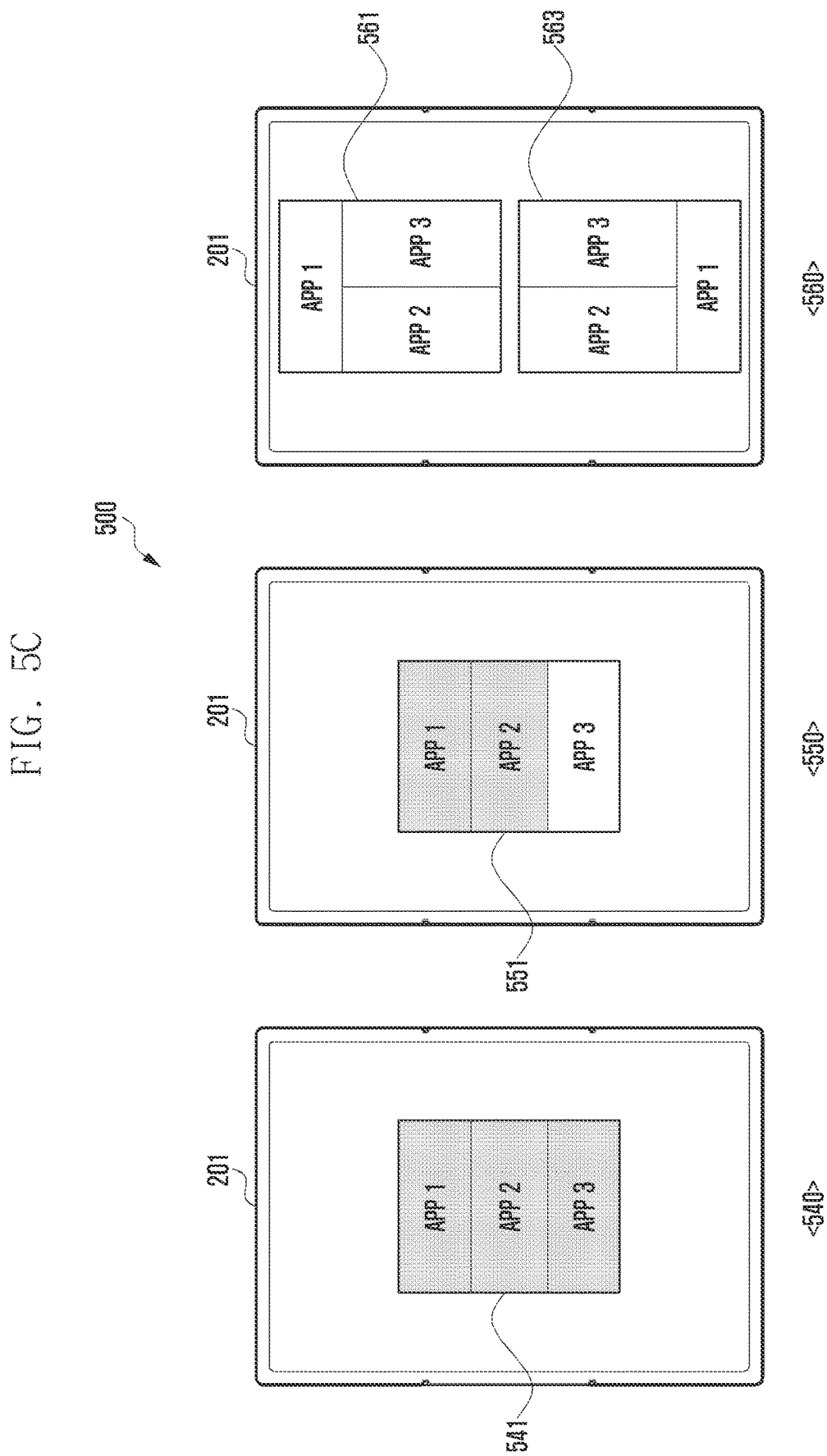

FIG. 6B
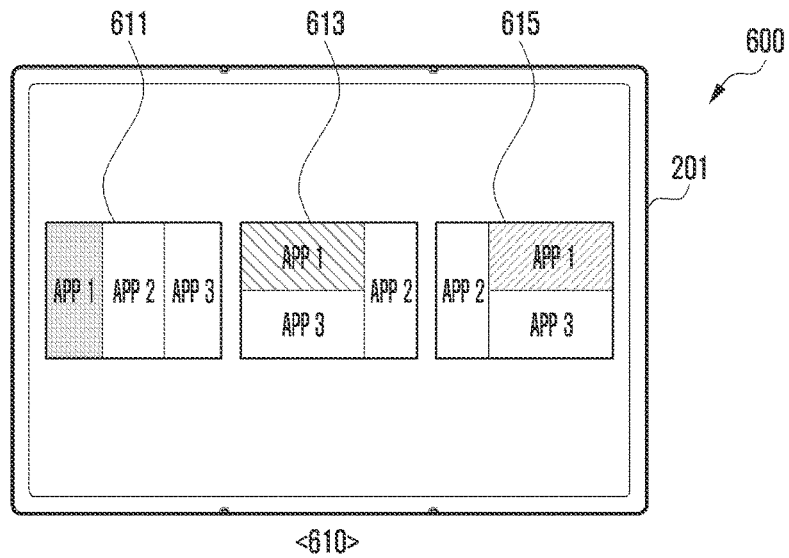
<610>
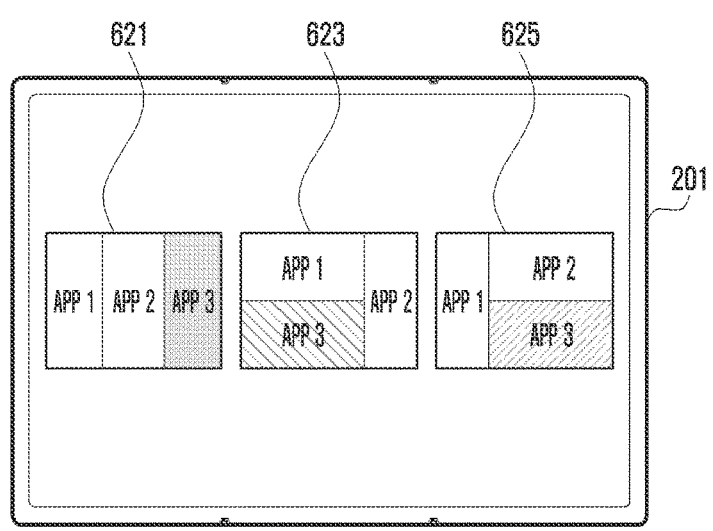
<620>
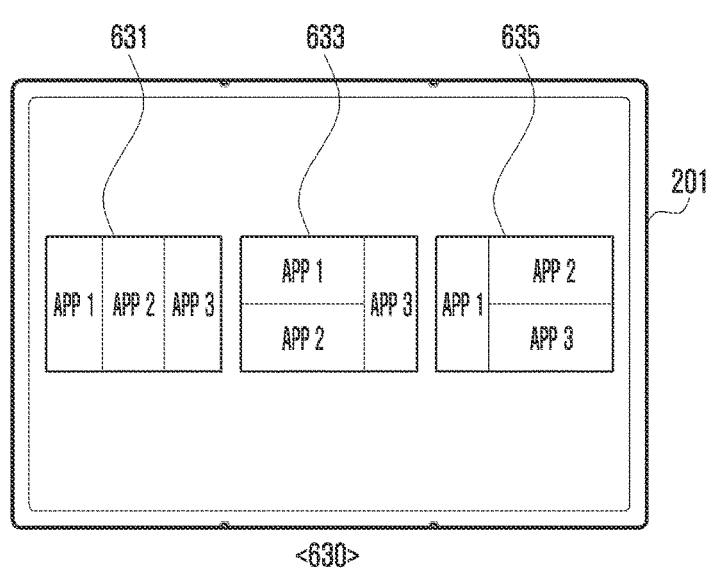
<630>

FIG. 11A
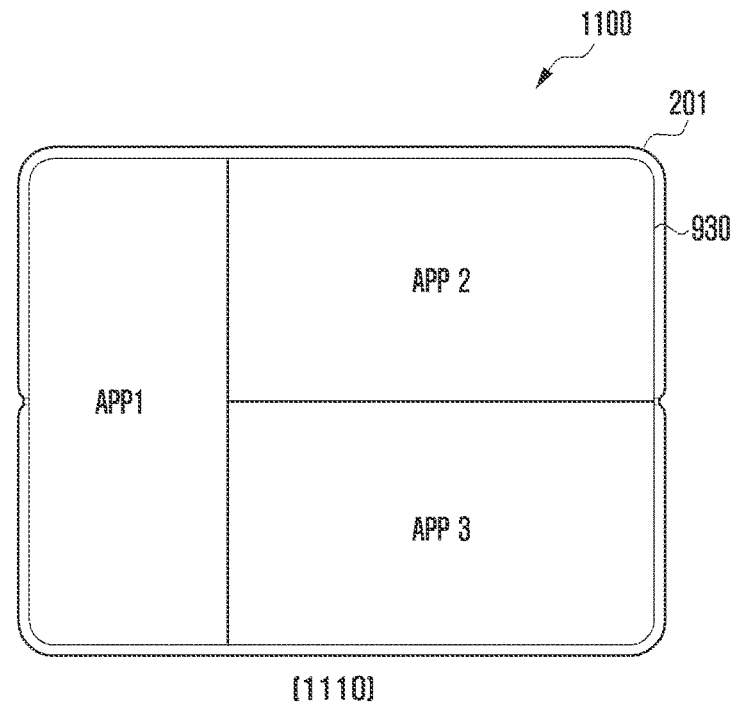
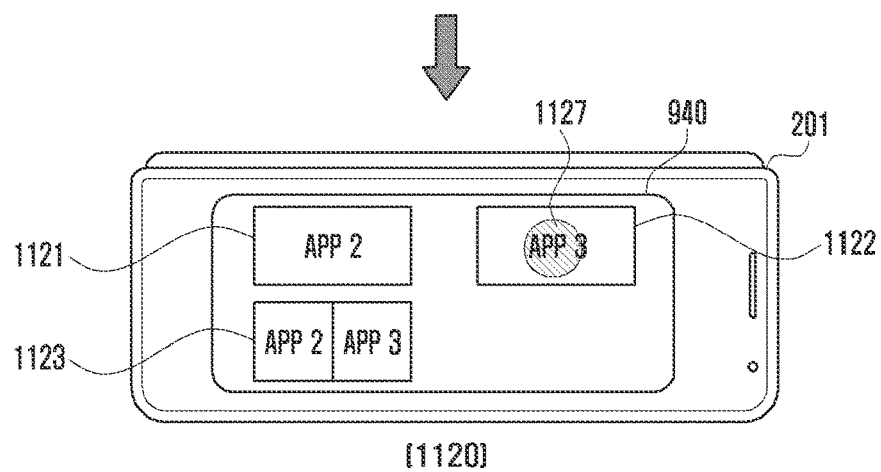
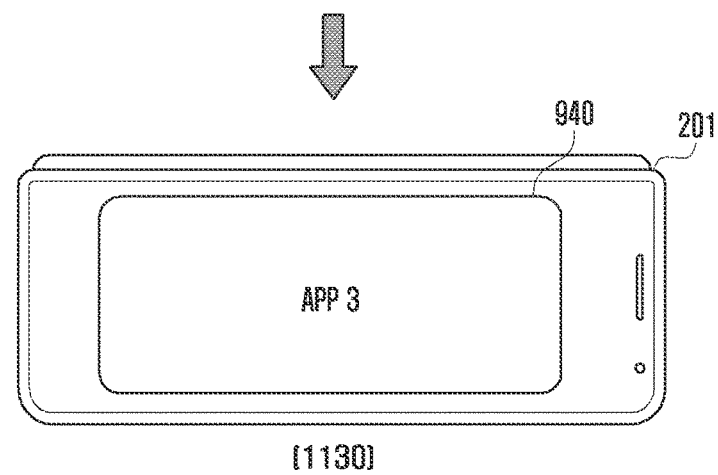

ELECTRONIC DEVICE AND LAYOUT CONFIGURATION METHOD USING SAME

CROSS-REFERENCE TO RELATED APPLICATION(S)

This application is a continuation application, claiming priority under § 365(c), of an International application No. PCT/KR2020/015161, filed on Nov. 2, 2020, which is based on and claims the benefit of a Korean patent application number 10-2019-0164699, filed on Dec. 11, 2019, in the Korean Intellectual Property Office, the disclosure of which is incorporated by reference herein in its entirety.

BACKGROUND

1. Field

The disclosure relates to an electronic device and a method for constituting a layout using the same.

2. Description of Related Art

An electronic device may include a touchscreen display so that the user can easily access various functions, and may provide screens of various applications through the touchscreen display. In particular, the electronic device may provide a multi-window function capable of simultaneously displaying two or more applications on one screen through the touchscreen display. That is, the display may be divided into two or more regions, and execution screens of two or more running applications may be simultaneously displayed in the two or more divided regions.

The above information is presented as background information only to assist with an understanding of the disclosure. No determination has been made, and no assertion is made, as to whether any of the above might be applicable as prior art with regard to the disclosure.

SUMMARY

To change the layout while displaying execution screens of two or more applications through the multi-window function, it may be cumbersome to go through multiple inputs, such as selecting a layout to be changed, and selecting an application and dragging it to a region of the selected layout to place the application's execution screen within the selected layout.

Aspects of the disclosure are to address at least the above-mentioned problems and/or disadvantages and to provide at least the advantages described below. Accordingly, an aspect of the disclosure is to provide an electronic device which provides a plurality of recommended layouts in which plural windows are differently arranged based on attributes of plural applications and states of the electronic device in response to detecting an event for changing the layout of plural windows while displaying a multi-window including plural windows corresponding to plural applications.

Additional aspects will be set forth in part in the description which follows and, in part, will be apparent from the description, or may be learned by practice of the presented embodiments.

In accordance with an aspect of the disclosure, an electronic device is provided. The electronic device includes a display, a memory, and a processor operatively connected to the display and the memory, wherein the processor may be configured to display a screen composed of a plurality of windows corresponding to a plurality of applications on the display, detect an event for changing a layout of the plurality of windows, display, in response to detecting the event, a plurality of recommended layouts in which the plurality of windows are differently arranged on the display based on attribute of each application and a state of the electronic device, and display, in case that one of the plurality of recommended layouts is selected, the plurality of windows to which the selected recommended layout is applied on the display.

In accordance with another aspect of the disclosure, a method of layout configuration of the electronic device is provided. The method includes displaying a screen composed of a plurality of windows corresponding to a plurality of applications on a display, detecting an event for changing a layout of the plurality of windows, displaying, in response to detecting the event, a plurality of recommended layouts in which the plurality of windows are differently arranged on the display based on attribute of each application and a state of the electronic device, and displaying, in case that one of the plurality of recommended layouts is selected, the plurality of windows to which the selected recommended layout is applied on the display.

The electronic device according to various embodiments of the disclosure may provide a plurality of recommended layouts in which plural windows are differently arranged based on attributes of plural applications and states of the electronic device in response to detecting an event for changing the layout of plural windows. As a plurality of recommended layouts in which multiple windows are differently arranged are provided, the user can easily change the layout.

The electronic device according to various embodiments of the disclosure provides a recommended layout in which plural windows are arranged in an optimal way based on attributes of multiple applications and states of the electronic device, so that usability of the multiple applications can also be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a flowchart of a method for displaying a plurality of recommended layouts in response to detecting a layout change event according to an embodiment of the disclosure;

FIGS. 4A, 4B, and 4C are diagrams for depicting a method of displaying a plurality of recommended layouts in response to detecting a layout change event according to various embodiments of the disclosure;

FIGS. 5A, 5B, and 5C are diagrams for depicting a method of determining applications to be placed in plural regions of a recommended layout based on attributes of multiple applications and states (e.g., portrait mode) of the electronic device according to various embodiments of the disclosure;

FIGS. 6A, 6B, and 6C are diagrams for depicting a method of determining applications to be placed in plural regions of a recommended layout based on attributes of multiple applications and states (e.g., landscape mode) of the electronic device according to various embodiments of the disclosure;

FIGS. 11A and 11B are diagrams for depicting a method of determining applications to be arranged in plural regions of the recommended layout based on attributes of multiple applications and states of the electronic device in response to detecting a layout change event according to various embodiments of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
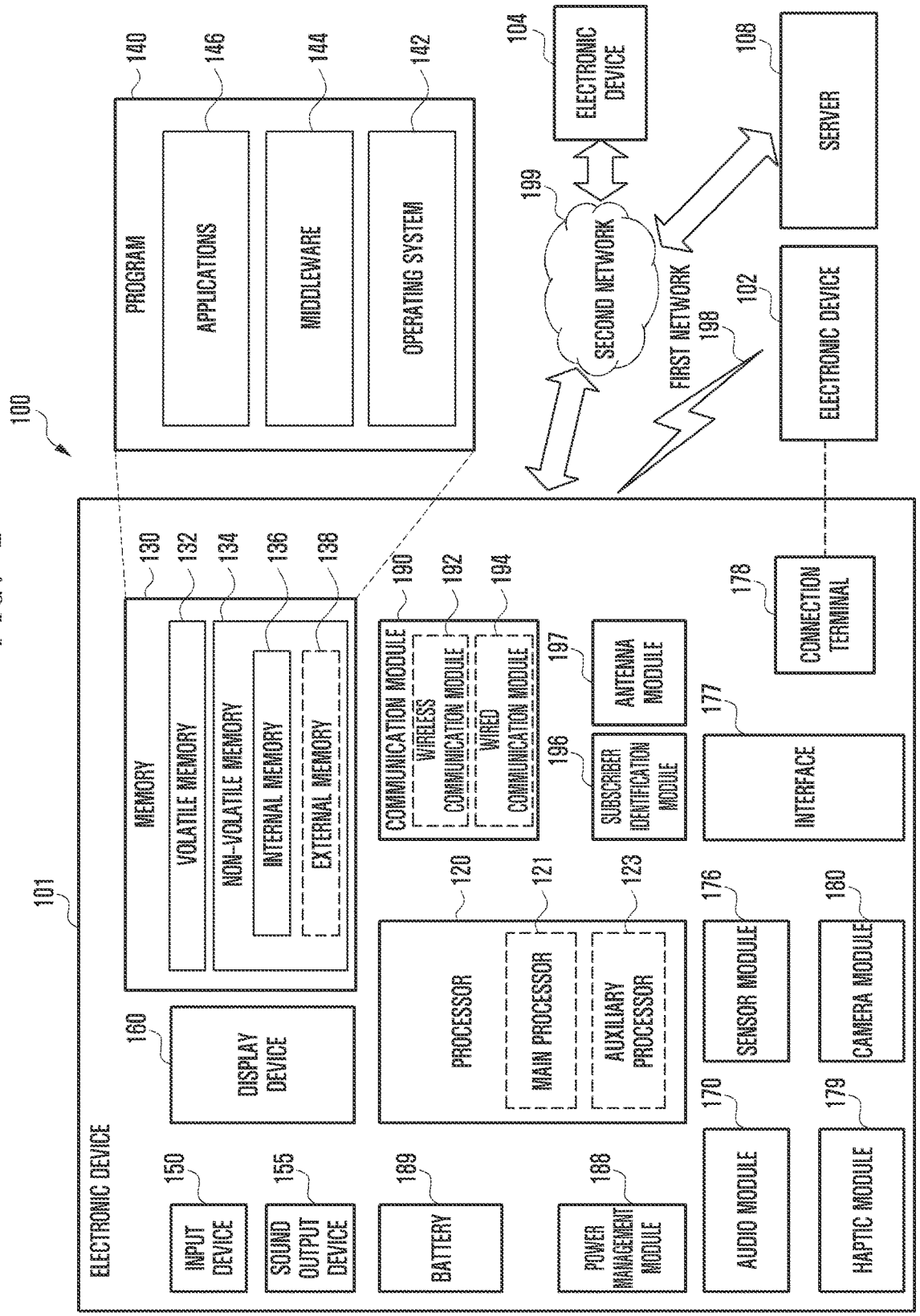
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
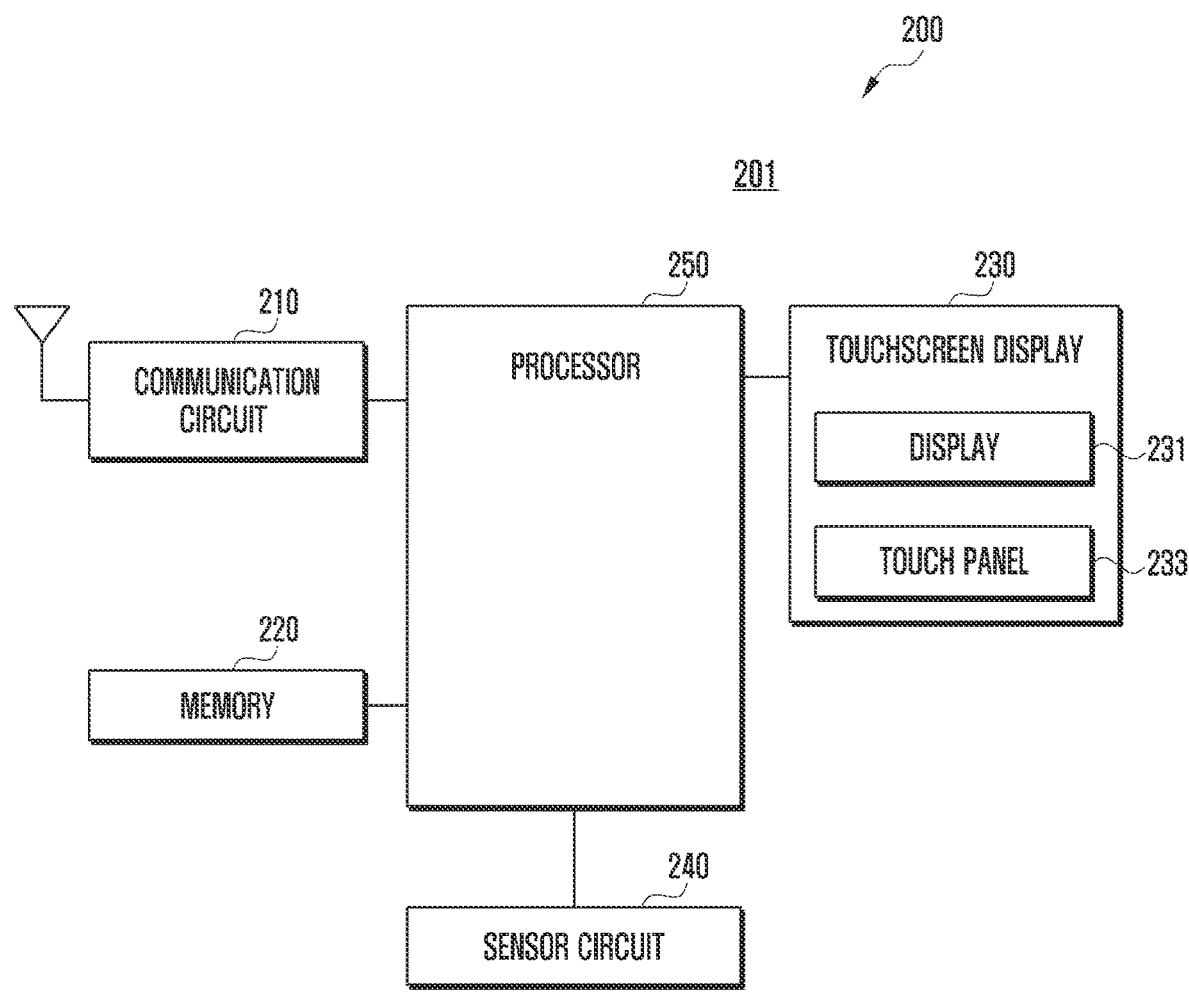
FIG. 2 is a block diagram of an electronic device according to an embodiment of the disclosure.

FIG. 2 is a block diagram of an electronic device according to an embodiment of the disclosure.

Referring to FIG. 2 depicting block diagram 200, an electronic device 201 (e.g., electronic device 101 in FIG. 1) may include a communication circuit 210 (e.g., communication module 190 in FIG. 1), a memory 220 (e.g., memory 130 in FIG. 1), a touchscreen display 230 (e.g., display device 160 in FIG. 1), a sensor circuit 240 (e.g., sensor module 176 in FIG. 1), and a processor 250 (e.g., processor 120 in FIG. 1).

According to an embodiment, the communication circuit 210 (e.g., communication module 190 in FIG. 1) may connect communication between the electronic device 201 and an external electronic device (e.g., electronic device 102, electronic device 104 in FIG. 1) or a server (e.g., server 108 in FIG. 1) under the control of the processor 250.

According to an embodiment, the memory 220 (e.g., memory 130 in FIG. 1) may store an event triggered to change the layout of plural windows. For example, the event for changing the layout may include rotation of the electronic device 201 by a preset angle or a designated input (e.g., pinch zoom gesture) on the display 231. Without being limited thereto, when the electronic device 201 is a foldable device, the event for changing the layout may further include a transition between folding states of the electronic device 201 (e.g., flat state or opening state (e.g., fully unfolded state), folded state or closing state, unfolded state with a preset angle (e.g., intermediate state)). The memory 220 may store a program that provides a plurality of recommended layouts in which multiple windows are arranged differently when an event for changing the layout of plural windows is detected. The memory 220 may store application attributes (e.g., whether landscape mode is supported, whether being a multimedia application (e.g., application continuously updating the screen such as a video application), and/or whether using an input interface (e.g., software keypad or keyboard displayed on the display 231)) for determining applications to be placed in plural divided regions of the recommended layout. The memory 220 may store priority information set in the application for determining applications to be placed in plural divided regions of the recommended layout, or history information of each application (e.g., the number of executions and/or execution time of each application).

According to an embodiment, the touchscreen display 230 (e.g., display device 160 in FIG. 1) may be integrally formed to include a display 231 and a touch panel 233.

In one embodiment, the touchscreen display 230 may display a screen (e.g., multi-window screen) composed of plural windows corresponding to multiple applications in execution under the control of the processor 250. When an event for changing the layout of plural windows is detected, under the control of the processor 250, the touchscreen display 230 may display plural recommended layouts in which multiple windows are arranged differently. Under the control of the processor 250, the touchscreen display 230 may display a multi-window screen including plural windows based on a recommended layout selected from among the plural recommended layouts.

According to an embodiment, the sensor circuit 240 (e.g., sensor module 176 in FIG. 1) may include an acceleration sensor, a geomagnetic sensor, and a gyro sensor. The sensor circuit 240 may obtain motion information of the electronic device 201 and detect the rotation of the electronic device 201 at a preset angle (e.g., switching of the orientation of the electronic device 201, for example, transition from portrait mode to landscape mode, or transition from landscape mode to portrait mode) based on the obtained information.

According to an embodiment, when the electronic device 201 is a foldable device, the sensor circuit 240 may identify the folding state of the electronic device 201. For example, the sensor circuit 240 may include at least one of a proximity sensor, an infrared (IR) sensor, a hall sensor, a motion sensor, an angle sensor, or an illuminance sensor. Based on the distance (or angle) between the first housing structure and the second housing structure of the electronic device 201, the sensor circuit 240 may identify the folding state (e.g., unfolded state, folded state, or unfolded state with a preset angle).

In relation to a constitution for identifying the folding state based on the distance (or angle) between the first housing structure and the second housing structure of the electronic device 201 according to an embodiment, a description will be given of various embodiments with reference to FIGS. 9A to 9D, 12A, and 12B.

According to an embodiment, the processor 250 (e.g., processor 120 in FIG. 1) may control the overall operation of the electronic device 201 and signal flows between internal components of the electronic device 201, and may perform data processing.

In one embodiment, the processor 250 may display a screen (e.g., multi-window screen) composed of plural windows corresponding to plural applications on the display 231 according to execution of the plural applications. The processor 250 may detect an event for changing the layout of the plural windows. Upon detecting an event for changing the layout, the processor 250 may display a plurality of recommended layouts in which plural windows are arranged differently on the display 231 based on attributes of the individual applications and the state of the electronic device 201 (e.g., orientation of the electronic device 201 (e.g., landscape mode or portrait mode), and/or folding state of the electronic device 201 (e.g., unfolded state, folded state, or unfolded state with a specific angle)). When one of the plural recommended layouts is selected, the processor 250 may display a plurality of windows to which the selected recommended layout is applied on the display 231.

The electronic device 201 according to various embodiments may include a display 231, a memory 220, and a processor 250 operatively connected to the display 231 and the memory 220, and the processor may be configured to display a screen composed of a plurality of windows corresponding to a plurality of applications on the display 231, detect an event for changing the layout of the plurality of windows, display, upon detecting the event, a plurality of recommended layouts in which the plurality of windows are arranged differently on the display 231 based on attribute of each of the plurality of applications and the state of the electronic device 201, and display, when one of the plurality of recommended layouts is selected, the plurality of windows to which the selected recommended layout is applied on the display 231.

According to various embodiments, the processor 250 may be configured to determine application to be placed respectively in a plurality of divided regions of a recommended layout based on the attribute of each of the plurality of applications and the state of the electronic device 201.

According to various embodiments, the processor 250 may be configured to determine application to be placed respectively in the plurality of divided regions of the recommended layout based on priority information set for each of the plurality of applications or history information of each of the plurality of applications.

According to various embodiments, the attribute of each application may include whether landscape mode is supported, whether being a multimedia application, the priority of the application, the execution order of the applications, and/or whether an input interface is used; the state of the electronic device 201 may include the orientation of the electronic device 201 and the folding state of the electronic device 201; and the folding state of the electronic device 201 may include an unfolded state, a folded state, and an intermediate state.

According to various embodiments, the processor 250 may be configured to record the number of times each of the plurality of recommended layouts is selected in the memory 220, and display the plurality of recommended layouts on the display 231 in order of number of times selected from most based on the number of times being selected.

According to various embodiments, when one of the plurality of recommended layouts is selected, the processor 250 may be configured to arrange the plurality of windows corresponding to the plurality of applications based on the selected recommended layout, and adjust at least one of the a plurality of regions based on proportions of the plurality of divided regions of the selected recommended layout and proportions set in the windows of the applications arranged in the plurality of divided regions.

According to various embodiments, the electronic device 201 may further include a sensor circuit 240; the event for changing the layout of the plurality of windows may include rotation of the electronic device 201 detected through the sensor circuit 240, a change in the folding state of the electronic device 201 detected through the sensor circuit 240, or a designated input detected on the display 231.

According to various embodiments, the rotation of the electronic device 201 may include a transition in the orientation of the electronic device 201; the transition in the orientation may include a transition from portrait mode to landscape mode or a transition from landscape mode to portrait mode.

According to various embodiments, the change in the folding state of the electronic device 201 may include a change from the unfolded state to the folded state or the intermediate state, a change from the folded state to the unfolded state or the intermediate state, or a change from the intermediate state to the unfolded state or the folded state.

According to various embodiments, the plurality of recommended layouts may be configured so that a plurality of regions thereof divided based on the number of the plurality of windows have different shapes.

According to various embodiments, the electronic device 201 may further include a housing structure, and the housing structure may include a first housing structure and a second housing structure; the processor 250 may be configured to detect a specific angle between the first housing structure and the second housing structure through the sensor circuit 240, and display the plurality of recommended layouts on the display 231 based on the detected specific angle.

FIG. 3 is a flowchart of a method for displaying a plurality of recommended layouts in response to detecting a layout change event according to an embodiment of the disclosure.

Referring to FIG. 3 depicting flowchart 300, at operation 310, the electronic device (e.g., electronic device 201 in FIG. 2) may display a screen composed of plural windows corresponding to plural applications on the display (e.g., display 231 in FIG. 2). For example, the electronic device 201 may support multi-window mode in which the display screen is divided into plural regions and windows (e.g., screen) of running applications are displayed respectively in the plural divided regions.

In one embodiment, at operation 320, the electronic device 201 may detect an event for changing the layout of the plurality of windows.

In one embodiment, when rotation (e.g., rotation of 90 degrees) of the electronic device 201 is detected through the sensor circuit (e.g., sensor circuit 240 in FIG. 2) while displaying the screen composed of plural windows on the display 231, the electronic device 201 may determine that an event for changing the layout is detected. For example, the sensor circuit 240 may include an acceleration sensor, a geomagnetic sensor, and/or a gyro sensor. The electronic device 201 may obtain movement information (e.g., movement direction of the electronic device 201) of the electronic device 201 through the sensor circuit 240, and may detect rotation of the electronic device 201 based on the obtained movement information. Rotation of the electronic device 201 may include a transition in the orientation of the electronic device 201, for example, a transition from portrait mode to landscape mode, or a transition from landscape mode to portrait mode.

In another embodiment, when a specified input is detected on the display 231 while displaying the screen composed of plural windows on the display 231, the electronic device 201 may determine that an event for changing the layout is detected. The specified input may include a pinch zoom gesture (e.g., pinch zoom-in gesture, pinch zoom-out gesture). However, it is not limited thereto. In one embodiment, the specified input may be configured by the user or designer of the electronic device 201.

In another embodiment, when the electronic device 201 is a foldable device, it may determine whether an event for changing the layout is detected based on the folding state of the electronic device 201 detected through the sensor circuit 240. For example, when the electronic device 201 is transitioned to the folded state through the sensor circuit 240 while displaying the screen composed of plural windows on the display 231 in the unfolded state (e.g., fully unfolded state) (or, unfolded state with a preset angle), the electronic device 201 may determine that an event for changing the layout is detected. It is not limited thereto, and when the electronic device 201 is transitioned from the folded state to the unfolded state with a preset angle (or, unfolded state (e.g., fully unfolded state)), the electronic device 201 may determine that an event for changing the layout is detected. Or, when the electronic device 201 is transitioned from the unfolded state with a preset angle to the folded state or unfolded state (e.g., fully unfolded state), the electronic device 201 may determine that an event for changing the layout is detected.

In connection with operation 320 of detecting an event for changing the layout of plural windows according to the above-described embodiment, various embodiments will be described with reference to FIGS. 4A to 4C 10A, 10B, 11A, and 11B below.

In one embodiment, at operation 330, the electronic device 201 may display a plurality of recommended layouts in which plural windows are differently arranged on the display 231 based on the attributes of individual applications and the state of the electronic device 201. For example, the electronic device 201 may determine applications to be placed respectively in the plural divided regions of a recommendation layout based on the attributes of the applications and the state of the electronic device 201.

In one embodiment, the attributes of applications may include whether landscape mode is supported, whether being a multimedia application, the priority of the application, the execution order of the applications, and/or whether an input interface (e.g., software keypad or keyboard displayed on the display 231) is used. The state of the electronic device 201 may include the orientation of the electronic device 201 and/or the folding state of the electronic device 201. For example, the orientation of the electronic device 201 may include landscape mode and portrait mode. The folding state of the electronic device 201 may include folded state, unfolded state (e.g., fully unfolded state), and unfolded state with a preset angle.

In connection with operation 330 of displaying a plurality of recommended layouts in which plural windows are differently arranged on the display 231 according to the above-described embodiment, various embodiments will be described with reference to FIGS. 5A to 5C, 6A to 6C, 10A, 10B, 11A, and 11B below.

In one embodiment, at operation 340, when one of the plural recommended layouts is selected, the electronic device 201 may display the plural windows to which the selected recommended layout is applied on the display 231. For example, the electronic device 201 may display a screen on which plural windows are arranged on the display 231 based on the selected recommended layout.

In one embodiment, although not shown, the electronic device 201 may store information on the recommended layout selected by the user (e.g., the number of times the recommended layout is selected) from among the plural recommended layouts displayed on the display 231 in the memory (e.g., memory 220 in FIG. 2). When the electronic device 201 performs operation 330 of displaying the recommended layouts based on information about the recommended layouts stored in the memory 220, it may display plural recommended layouts on the display 231 in order of number of times selected from most.

A method of layout constituting of the electronic device 201 according to various embodiments may include: displaying a screen composed of a plurality of windows corresponding to a plurality of applications on the display 231; detecting an event for changing the layout of the plurality of windows; displaying, in response to detecting the event, a plurality of recommended layouts in which the plurality of windows are differently arranged on the display 231 based on the attribute of each application and the state of the electronic device; and displaying, when one of the plurality of recommended layouts is selected, the plurality of windows to which the selected recommended layout is applied on the display 231.

According to various embodiments, displaying the plurality of recommended layouts may include determining application to be placed respectively in a plurality of divided regions of a recommendation layout based on the attribute of each of the plurality of applications and the state of the electronic device 201.

According to various embodiments, displaying the plurality of recommended layouts include determining application to be placed respectively in the plurality of divided regions of a recommended layout based on priority information set for each of the plurality of applications or history information of each of the plurality of applications.

According to various embodiments, the attribute of each application may include whether the application supports landscape mode, whether the application is a multimedia application, the priority of the application, the execution order of the application, and/or whether the application uses an input interface; the state of the electronic device 201 may include the orientation of the electronic device 201 and the folding state of the electronic device 201; the orientation of the electronic device 201 may include a landscape mode and a portrait mode; and the folding state of the electronic device 201 may include an unfolded state, a folded state, and an intermediate state.

According to various embodiments, displaying the plurality of recommended layouts may include displaying the plurality of recommended layouts on the display 231 in order of number of times selected from most based on the number of times each of the plurality of recommended layouts is selected recorded in the memory 220.

According to various embodiments, the method may further include: arranging, when one of the plurality of recommended layouts is selected, the plurality of windows corresponding to the plurality of applications based on the selected recommended layout; and adjusting at least one of a plurality of divided regions based on proportions of the plurality of divided regions of the selected recommended layout and proportions set in the windows of the applications arranged in the plurality of divided regions.

According to various embodiments, detecting the event for changing the layout of the plurality of windows may include: detecting rotation of the electronic device 201 through the sensor circuit 240; detecting a change in the folding state of the electronic device 201 through the sensor circuit 240; or detecting a specified input on the display 231.

According to various embodiments, the rotation of the electronic device 201 may include a transition in the orientation of the electronic device 201; the transition in the orientation may include a transition from portrait mode to landscape mode or a transition from landscape mode to portrait mode; and the change in the folding state of the electronic device 201 may include a change from the unfolded state to the folded state or the intermediate state, a change from the folded state to the unfolded state or the intermediate state, or a change from the intermediate state to the unfolded state or the folded state.

According to various embodiments, displaying the plurality of recommended layouts may include: detecting a specific angle between a first housing structure and a second housing structure included in the electronic device 201 through the sensor circuit 240; and displaying the plurality of recommended layouts on the display 231 based on the detected specific angle.

Figure 4A:
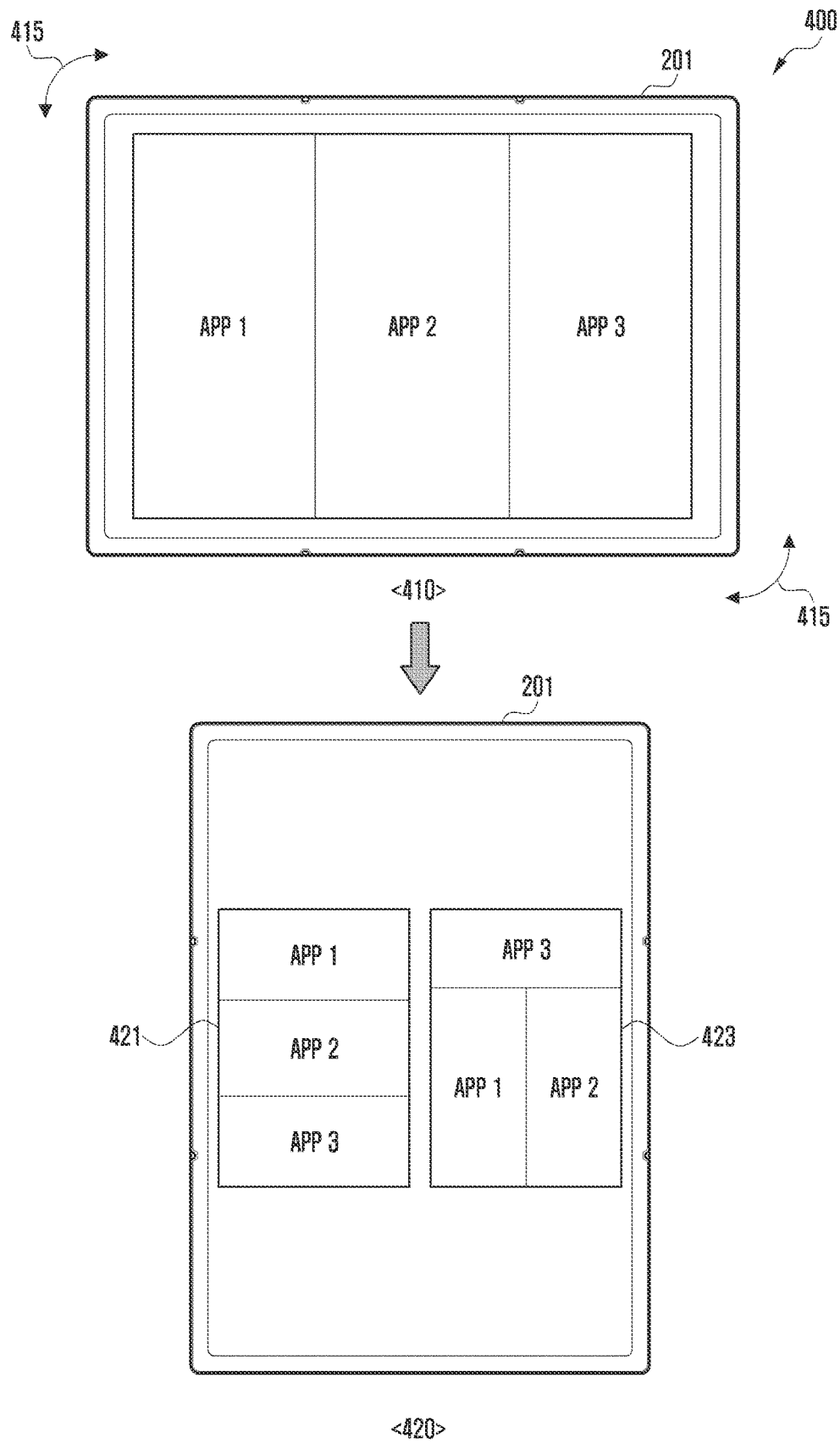
Figure 4B:
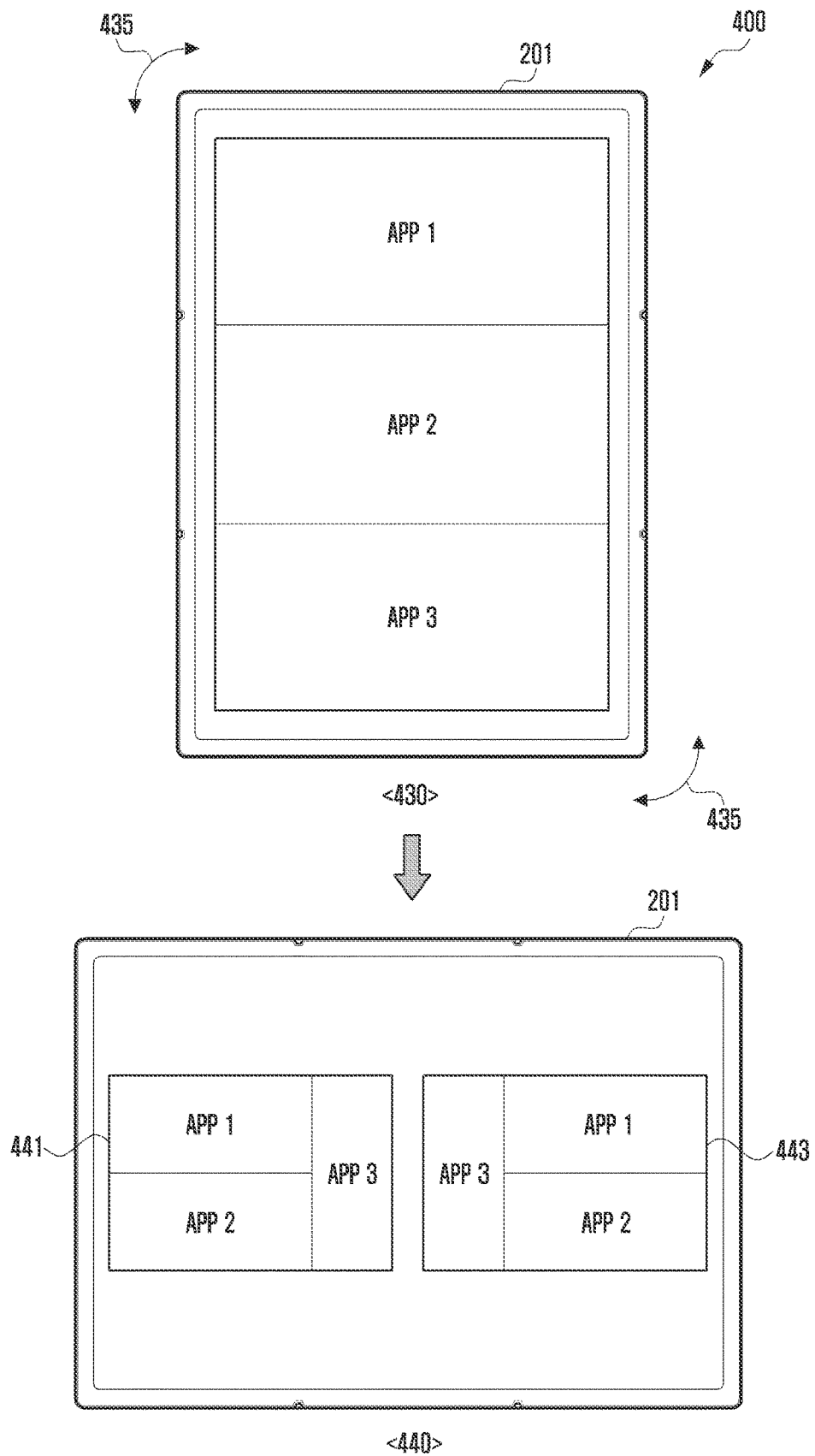

FIGS. 4A, 4B, and 4C are diagrams for depicting a method of displaying a plurality of recommended layouts in response to detecting a layout change event according to various embodiments of the disclosure.

In one embodiment, the electronic device (e.g., electronic device 201 in FIG. 2) may detect rotation (e.g., rotation of 90 degrees) of the electronic device 201 through the sensor circuit (e.g., sensor circuit 240 in FIG. 2) while displaying a screen composed of plural windows corresponding to plural applications on the display (e.g., display 231 in FIG. 2).

Referring to FIG. 4A depicting diagram 400, an electronic device 201 in landscape mode may execute first application APP1, second application APP2, and third application APP3, and display a window of first application APP1, a window of second application APP2, and a window of third application APP3 as a multi-window screen on a display 231 as shown by indicia 410. When rotation 415 (e.g., rotation of 90 degrees) of the electronic device 201 is detected through the sensor circuit 240 in landscape mode, the electronic device 201 may be transitioned to portrait mode as shown by indicia 420. When rotation 415 (e.g., rotation of 90 degrees) of the electronic device 201 is detected, the electronic device 201 may determine that an event for changing the layout is detected, and display plural recommended layouts 421 and 423 in which plural windows are differently arranged on the display 231 based on the attributes of the plural applications being executed and the state of the electronic device 201.

As another example, with reference to FIG. 4B depicting diagram 400, an electronic device 201 in portrait mode may execute first application APP1, second application APP2, and third application APP3, and display a window of first application APP1, a window of second application APP2, and a window of third application APP3 as a multi-window screen on the display 231 as shown by indicia 430. When rotation 435 (e.g., rotation of 90 degrees) of the electronic device 201 is detected in portrait mode, the electronic device 201 may be transitioned to landscape mode as shown by indicia 440. When rotation 415 (e.g., rotation of 90 degrees) of the electronic device 201 is detected, the electronic device 201 may determine that an event for changing the layout is detected, and display plural recommended layouts 441 and 443 in which plural windows are differently arranged on the display 231 based on the attributes of the plural applications being executed and the state of the electronic device 201 (e.g., orientation of the electronic device 201 (e.g., landscape mode or portrait mode)).

In another embodiment, the electronic device 201 may detect an input for changing the layout at a specified location while displaying the window of first application APP1, the window of second application APP2, and the window of third application APP3 on the display 231 as a multi-window screen in landscape mode or portrait mode.

For example, with reference to FIG. 4C depicting diagram 400, as shown by indicia 450, an electronic device 201 in portrait mode may detect an input for changing the layout, for example, a pinch zoom-in gesture 455 at a boundary 451 between the window of first application APP1 and the window of second application APP2 and at a boundary 452 between the window of second application APP2 and the window of third application APP3.

As another example, as shown by indicia 460, the electronic device 201 in landscape mode may detect an input for changing the layout, for example, a pinch zoom-in gesture 465 at a boundary 461 between the window of first application APP1 and the window of second application APP2 and at a boundary 463 between the window of second application APP2 and the window of third application APP3.

The input for changing the layout according to an embodiment is not limited to the pinch zoom-in gesture 455 or 465 described above. For example, the input for changing the layout may include a pinch zoom-out gesture. The location where an input for changing the layout is detected according to an embodiment has been described as boundaries 451, 452, 461, and 463 between windows of two applications, but it is not limited thereto.

In one embodiment, in response to detecting an input for changing the layout, the electronic device 201 may display plural recommended layouts 421 and 423 or 441 and 443 in which plural windows are differently arranged on the display 231 based on the attributes of the plural applications and the state of the electronic device 201 as shown by indicia 420 or 440.

FIGS. 5A, 5B, and 5C are diagrams for depicting a method of determining applications to be placed in plural regions of a recommended layout based on attributes of multiple applications and states (e.g., portrait mode) of the electronic device 201 according to various embodiments of the disclosure.

In various embodiments, the electronic device (e.g., electronic device 201 in FIG. 2) may execute plural applications, for example, three applications, and display a multi-window screen composed of three windows corresponding thereto on the display (e.g., display 231 in FIG. 2). While displaying the multi-window screen, when the electronic device 201 is rotated and transitioned to portrait mode (e.g., FIG. 4A), or when the electronic device 201 in portrait mode detects a specified input for changing the layout (e.g., indicia 450 in FIG. 4C), the electronic device 201 may display plural recommended layouts in which plural windows are differently arranged on the display 231 based on the attributes of the applications and the state of the electronic device 201 (e.g., orientation of the electronic device 201).

Referring to FIG. 5A, depicting diagram 500, according to various embodiments, when the electronic device 201 is transitioned to portrait mode, or a specified input is detected in portrait mode, the plural layouts that can be displayed by default may include layouts in portrait mode (e.g., first layout 502, second layout 504, and/or third layout 506), each of which is divided into three regions.

In the following embodiment, it will be described as displaying a recommended layout that is divided into three regions according to the execution of three applications, but the disclosure is not limited thereto. When more than three applications are executed, a recommended layout divided into more than three regions can be displayed.

In one embodiment, the plural recommended layouts (e.g., first layout 502, second layout 504, and/or third layout 506) may have divided regions of different shapes.

For example, as shown by indicia 501, the first layout 502 may be divided into a first region 502a (e.g., upper region of the first layout 502), a second region 502b (e.g., middle region of the first layout 502), and a third region 502c (e.g., lower region of the first layout 502). The first region 502a, the second region 502b, and the third region 502c may have the same size (e.g., area) after division.

As another example, as shown by indicia 503, the second layout 504 may be divided into a first region 504a (e.g., upper region of the second layout 504), a second region 504b (e.g., lower left region of the second layout 504), and a third region 504c (e.g., lower right region of the second layout 504). The second region 504b and the third region 504c may have the same size.

As another example, as shown by indicia 505, the third layout 506 may be divided into a first region 506a (e.g., upper left region of the third layout 506), a second region 506b (e.g., upper right region of the third layout 506), and a third region 506c (e.g., lower region of the third layout 506). The first region 506a and the second region 506b may have the same size.

The shapes of the layouts (e.g., first layout 502, second layout 504, and/or third layout 506) recommended when the electronic device 201 is in portrait mode described according to various embodiments are not limited thereto.

Referring to FIGS. 5B and 5C according to various embodiments, applications to be placed respectively in the divided regions of the recommended layout may be determined based on the attributes of the plural applications being executed and the state of an electronic device 201, for example, portrait mode being an orientation of an electronic device 201. The attributes of an application may include whether the application supports landscape mode, whether the application is a multimedia application, the priority of the application, the execution order of the application, and/or whether the application uses an input interface (e.g., software keypad or keyboard displayed on the display 231).

In one embodiment, the electronic device 201 may place the window of an application including content optimized for viewing such as multimedia (e.g., video or music) in an upper region among the plural divided regions of the recommended layout based on the attributes of each application. For example, when first application APP1 among first application APP1, second application APP2, and third application APP3 is a multimedia-related application (e.g., application related to video playback or music playback), as shown by indicia 510, the electronic device 201 may display plural layouts 511 and 513 in which the window of first application APP1 is placed in the upper region (e.g., first region 502a of the first layout 502 in FIG. 5A, first region 504a of the second layout 504) among the plural regions on the display 231. After placing the window of first application APP1 in the first region of the plural layouts 511 and 513, the electronic device 201 may place the window of second application APP2 and the window of fourth application APP3 respectively in the second region (e.g., second region 502b of the first layout 502, second region 504b of the second layout 504 in FIG. 5A) and the third region (e.g., third region 502c of the first layout 502, third region 504c of the second layout 504 in FIG. 5A) among the plural regions.

In another embodiment, the electronic device 201 may place the window of an application that can use an input interface in an upper region among the plural divided regions of the recommended layout based on the attributes of the applications. For example, when first application APP1 among first application APP1, second application APP2, and third application APP3 is an application that can use an input interface (e.g., memo application, communication application (e.g., message application, social network service (SNS) application), search application), as shown by indicia 510, the electronic device 201 may display plural layouts 511 and 513 in which the window of first application APP1 is placed in an upper region (e.g., first region 502a of the first layout 502, first region 504a of the second layout 504 in FIG. 5A) among the plural regions on the display 231. After placing the window of first application APP1 in the first region of the plural layouts 511 and 513, the electronic device 201 may place the window of second application APP2 and the window of third application APP3 respectively in the second region (e.g., second region 502b of the first layout 502, second region 504b of the second layout 504 in FIG. 5A) and the third region (e.g., third region 502c of the first layout 502, third region 504c of the second layout 504 of FIG. 5A) except for the first region among the plural regions. For instance, as an input interface, for example, a software keypad (or keyboard) displayed on the display 231 is generally displayed in the lower region of the display 231, to prevent the application's screen from being hidden while entering text using the keypad, the window of first application APP1 capable of using an input interface may be placed in an upper region (e.g., first region 502a of the first layout 502, first region 504a of the second layout 504 in FIG. 5A) among the plural regions.

In another embodiment, based on the priority information configured in each application or history information of each application (e.g., the number of times each application has been executed and/or execution time thereof), the electronic device 201 may place the window of a high-priority application or frequently used application among first application APP1, second application APP2, and third application APP3 in an upper region (e.g., first region 502a of the first layout 502, first region 504a of the second layout 504 in FIG. 5A) of the plurality of regions.

In one embodiment, based on the attributes of individual applications, the electronic device 201 may place the window of an application requiring user interaction such as a game application in a lower region among the plural divided regions of the recommended layout. For example, when third application APP3 among first application APP1, second application APP2, and third application APP3 is a game application, as shown by indicia 520, the electronic device 201 may display plural layouts 521 and 523 in which the window of third application APP3 is placed in a lower region (e.g., third region 502c of the first layout 502 in FIG. 5A, third region 506c of the third layout 506) on the display 231. After placing the window of third application APP3 in the third region of the plural layouts 511 and 513, the electronic device 201 may place the window of first application APP1 and the window of second application APP2 respectively in a first region (e.g., first region 502a of the first layout 502 in FIG. 5A, first region 506a of the third layout 506) and a second region (e.g., second region 502b of the first layout 502 in FIG. 5A, second region 506b of the third layout 506). As the window of the game application according to an embodiment is placed in a lower region (e.g., third region (e.g., third region 502c of the first layout 502 in FIG. 5A, third region 506c of the third layout 506)) among the plural regions, when the electronic device 201 is gripped, this may not only facilitate screen manipulation of the game application placed in the lower region but also enhance accessibility.

In one embodiment, when the attribute of first application APP1, the attribute of second application APP2, and the attribute of third application APP3 are the same based on the attributes of the individual applications, as shown by indicia 530, the electronic device 201 may display a plurality of layouts 531, 533 and 535 configured by default (e.g., first layout 502, second layout 504, and/or third layout 506 in FIG. 5A) on the display 231.

In one embodiment, when an application optimized for landscape mode (e.g., video application, photograph application) is included, based on the attributes of the individual applications, the electronic device 201 may place the window of the application in a region whose horizontal proportion is greater than the vertical proportion among the divided regions of the plural layouts. For instance, when first application APP1, second application APP2, and third application APP3 are an application optimized for landscape mode, as shown by indicia 540, the electronic device 201 may display, on the display 231, the layout 541 in which the window of first application APP1 is placed in a first region (e.g., first region 502a of the first layout 502 in FIG. 5A), the window of second application APP2 is placed in a second region (e.g., second region 502b of the first layout 502 in FIG. 5A), and the window of third application APP3 is placed in a third region (e.g., third region 502c of the first layout 502 in FIG. 5A).

As another example, when first application APP1 and second application APP2 among first application APP1, second application APP2, and third application APP3 are an application optimized for landscape mode, as shown by indicia 550, the electronic device 201 may display, on the display 231, the layout 551 in which the window of first application APP1 is placed in a first region (e.g., first region 502a of the first layout 502 in FIG. 5A), and the window of second application APP2 is placed in a second region (e.g., second region 502b of the first layout 502 in FIG. 5A). When third application APP3 is not an application optimized for landscape mode, the electronic device 201 may place the window of third application APP3 in a third region of the layout 551 (e.g., third region 502c of the first layout 502 in FIG. 5A), where the screen of third application APP3 may be displayed in a partially enlarged form in correspondence to the size of the third region.

As another example, when first application APP1 among first application APP1, second application APP2, and third application APP3 is an application optimized for landscape mode, as shown by indicia 560, the electronic device 201 may display, on the display 231, the layout 561 in which the window of first application APP1 is placed in a first region (e.g., first region 504a of the second layout 504 in FIG. 5A) and/or the layout 563 in which the window of first application APP1 is placed in a third region (e.g., third region 506c of the third layout 506 in FIG. 5A). After placing the window of first application APP1 in the first region of the layout 561, the electronic device 201 may place the window of second application APP2 and the window of third application APP3 respectively in the second region (e.g., second region 504b of the second layout 504 in FIG. 5A) and the third region (e.g., third region 504c of the second layout 504 in FIG. 5A) for display. After placing the window of first application APP1 in the third region of the layout 563, the electronic device 201 may place the window of second application APP2 and the window of third application APP3 respectively in the first region (e.g., first region 502a of the first layout 502 in FIG. 5A) and the second region (e.g., second region 504b of the second layout 504 in FIG. 5A) for display.

According to the above-described embodiments, based on the attributes of plural applications and the state (e.g., portrait mode) of the electronic device 201, the electronic device 201 may place the windows of the applications respectively in plural divided regions of a recommended layout, and provide the user with plural recommended layouts 511, 513, 521, 523, 531, 533, 535, 541, 551, 561, 563 in which the windows of the plural applications APP1, APP2 and APP3 are differently arranged. The user may easily change the layout for the plural windows by selecting a desired layout from among the plural recommended layouts provided.

Figure 6A:
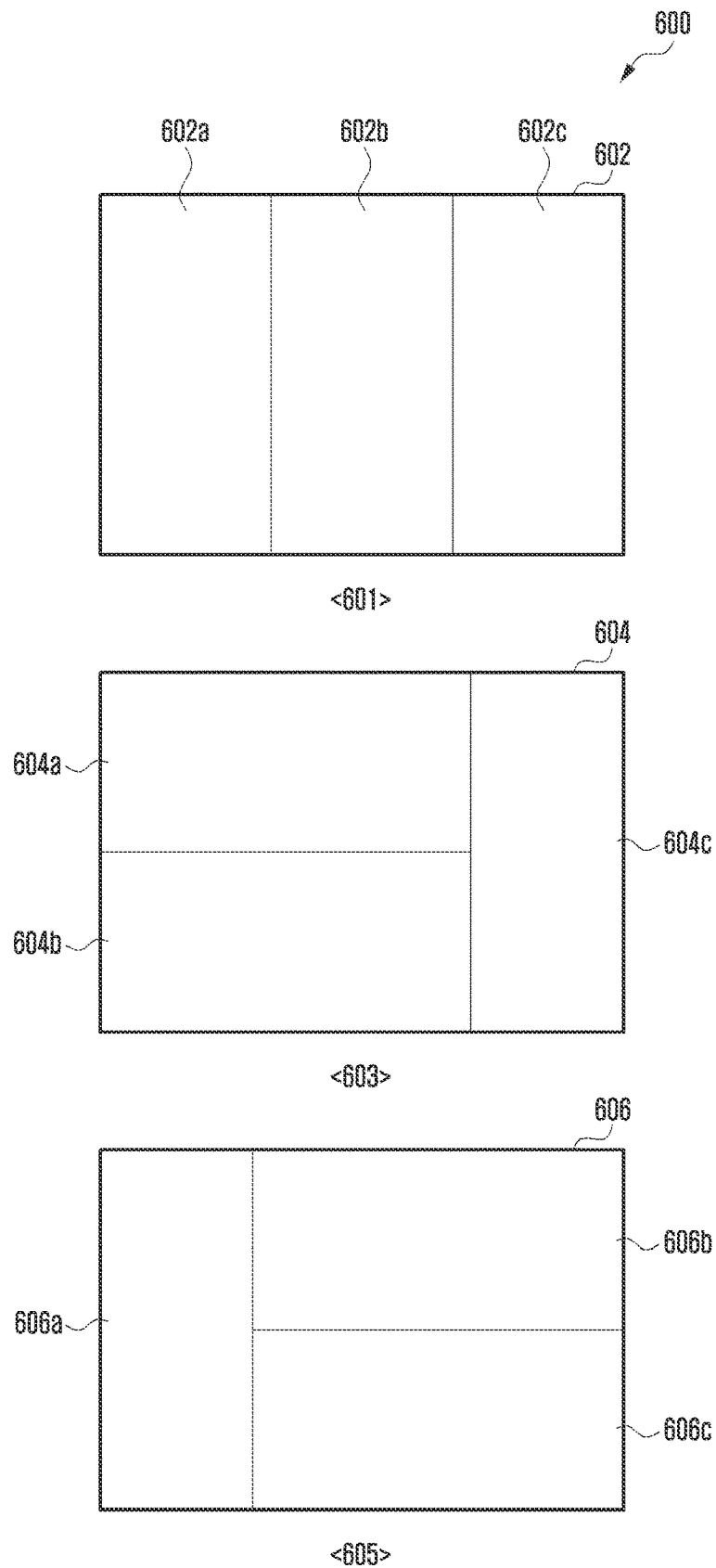
Figure 6C:
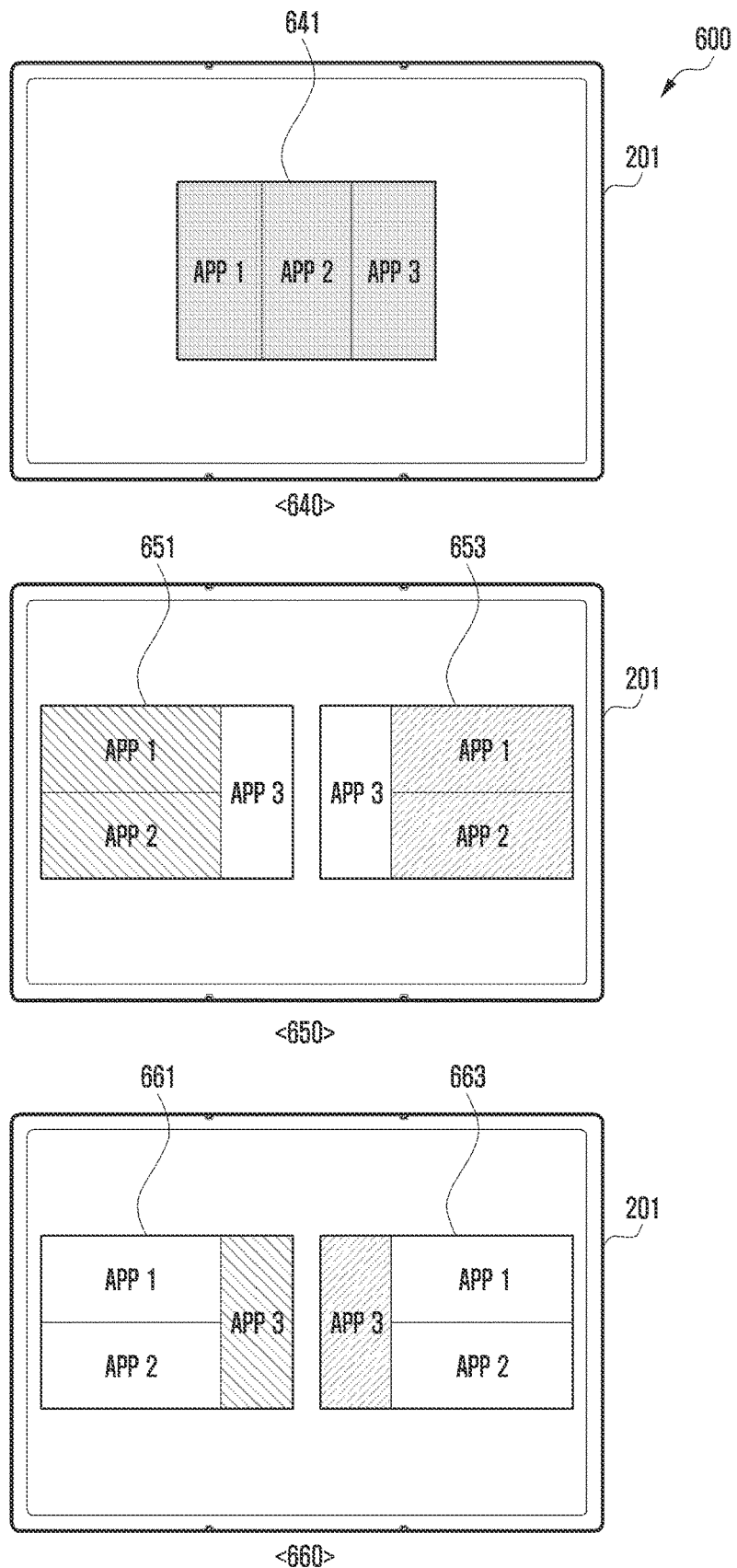

FIGS. 6A, 6B, and 6C are diagrams for depicting a method of determining applications to be placed in plural regions of a recommended layout based on attributes of multiple applications and states (e.g., landscape mode) of the electronic device 201 according to various embodiments of the disclosure.

In various embodiments, the electronic device (e.g., electronic device 201 in FIG. 2) may execute a plurality of applications, for example, three applications and display a multi-window screen composed of three windows corresponding thereto on the display (e.g., display 231 in FIG. 2). While displaying the multi-window screen, when the electronic device 201 is rotated (e.g., rotation of 90 degrees) and transitioned to landscape mode (e.g., FIG. 4B), or when the electronic device 201 in landscape mode detects a specified input for changing the layout (e.g., indicia 460 in FIG. 4C), the electronic device 201 may display plural recommended layouts in which plural windows are differently arranged on the display 231 based on the attributes of the applications and the state of the electronic device 201 (e.g., orientation of the electronic device 201).

Referring to FIG. 6A, depicting diagram 600, according to various embodiments, when the electronic device 201 is transitioned to landscape mode, or a specified input is detected in landscape mode, the plural layouts that can be displayed by default may include layouts in landscape mode (e.g., first layout 602, second layout 604, and/or third layout 606), each of which is divided into three regions.

In one embodiment, the plural recommended layouts (e.g., first layout 602, second layout 604, and/or third layout 606) may have divided regions of different shapes.

For example, as shown by indicia 601, the first layout 602 may be divided into a first region 602a (e.g., left region of the first layout 602), a second region 602b (e.g., middle region of the first layout 602), and a third region 602c (e.g., right region of the first layout 602). The first region 602a, the second region 602b, and the third region 602c may have the same size (e.g., area) after division.

As another example, as shown by indicia 603, the second layout 604 may be divided into a first region 604a (e.g., upper left region of the second layout 604), a second region 604b (e.g., lower left region of the second layout 604), and a third region 604c (e.g., right region of the second layout 604). The first region 604a and the second region 604b may have the same size.

As another example, as shown by indicia 605, the third layout 606 may be divided into a first region 606a (e.g., left region of the third layout 606), a second region 606b (e.g., upper right region of the third layout 606), and a third region 606c (e.g., lower right region of the third layout 606). The second region 606b and the third region 606c may have the same size.

The shapes of the layouts (e.g., first layout 602, second layout 604, and/or third layout 606) recommended when the electronic device 201 is in landscape mode described according to various embodiments are not limited thereto.

Referring to FIGS. 6B and 6C, depicting diagram 600, according to various embodiments, applications to be placed respectively in the divided regions of the recommended layout may be determined based on the attributes of the plural applications being executed and the state of the electronic device 201, for example, landscape mode being an orientation of the electronic device 201. The attributes of an application may include whether the application supports landscape mode, whether the application is a multimedia application, the priority of the application, the execution order of the application, and/or whether the application uses an input interface (e.g., software keypad or keyboard displayed on the display 231).

In one embodiment, the electronic device 201 may place the window of an application including content optimized for viewing such as multimedia (e.g., video or music) or an application that can use an input interface in a left region or upper region among the plural divided regions of the recommended layout based on the attributes of each application. For example, when first application APP1 among first application APP1, second application APP2, and third application APP3 is a multimedia-related application or an application that can use an input interface, as shown by indicia 610, the electronic device 201 may display, on the display 231, plural layouts 611, 613 and 615 in which the window of first application APP1 is placed in a left region (e.g., first region 602a of the first layout 602 in FIG. 6A) or upper region (e.g., first region 604a of the second layout 604 in FIG. 6A (e.g., upper left region), and/or second region 606b of the third layout 606 (e.g., upper right region)) among the plural regions. The electronic device 201 may place the window of second application APP2 and the window of third application APP3 respectively in regions other than the region where the window of first application APP1 is placed among the plural regions in the plural layouts 611, 613 and 615 for display.

In one embodiment, based on the attributes of individual applications, the electronic device 201 may place the window of an application requiring user interaction such as a game application in a right region or lower region among the plural divided regions of the recommended layout. For example, when third application APP3 among first application APP1, second application APP2, and third application APP3 is a game application, as shown by indicia 620, the electronic device 201 may display, on the display 231, plural layouts 621, 623 and/or 625 in which the window of third application APP3 is placed in a right region (e.g., third region 602c of the first layout 602 in FIG. 6A) and/or in a lower region (e.g., second region 604b of the second layout 604 in FIG. 6A (e.g., lower left region), third region 606c of the third layout 606 (e.g., lower right region)). The electronic device 201 may place the window of second application APP2 and the window of third application APP3 respectively in regions other than the region where the window of first application APP1 is placed among the plural regions in the plural layouts 621, 623 and 615 for display.

In one embodiment, when the attribute of first application APP1, the attribute of second application APP2, and the attribute of third application APP3 are the same based on the attributes of the individual applications, as shown by indicia 630, the electronic device 201 may display a plurality of layouts 631, 633 and 635 configured by default (e.g., first layout 602, second layout 604, third layout 606 in FIG. 6A) on the display 231.

In one embodiment, when including an application that does not support landscape mode based on the attributes of each application, the electronic device 201 may place the window of the application in a divided region while maintaining the vertical view in the layout. For example, when first application APP1, second application APP2, and third application APP3 do not support landscape mode, as shown by indicia 640, the electronic device 201 may display, on the display 231, the layout 641 in which the window of first application APP1 is placed in a first region (e.g., first region 602a of the first layout 602 (e.g., left region) in FIG. 6A), the window of second application APP2 is placed in a second region (e.g., second region 602b of the first layout 602 (e.g., middle region) in FIG. 6A), and the window of third application APP3 is placed in a third region (e.g., third region 602c of the first layout 602 (e.g., right region) in FIG. 6A).

As another example, when first application APP1 and second application APP2 among first application APP1, second application APP2, and third application APP3 are an application optimized for landscape mode, as shown by indicia 650, the electronic device 201 may display, on the display 231, the layout 651 in which the window of first application APP1 is placed in a first region (e.g., first region 604a of the second layout 604 (e.g., upper left region) in FIG. 6A) and the window of second application APP2 is placed in a second region (e.g., second region 604b of the second layout 604 (e.g., lower left region) in FIG. 6A), and/or the layout 653 in which the window of first application APP1 is placed in a second region (e.g., second region 606b of the third layout 606 (e.g., upper right region) in FIG. 6A) and the window of second application APP2 is placed in a third region (e.g., third region 606c of the third layout 606 (e.g., lower right region) in FIG. 6A). The electronic device 201 may place the window of third application APP3 in a third region (e.g., third region 604c of the second layout 604 (e.g., right region) in FIG. 6A) or a first region (e.g., first region 606a of the third layout 606 (e.g., left region) in FIG. 6A) within the layout 651 or 653.

As another example, when third application APP3 among first application APP1, second application APP2, and third application APP3 includes an application that does not support landscape mode, the windows of the applications may be placed in divided regions in the layout while maintaining the vertical view. For instance, as shown by indicia 660, the electronic device 201 may display, on the display 231, the layout 661 in which the window of third application APP3 is placed in a third region (e.g., third region 604c of the second layout 604 (e.g., right region) in FIG. 6A), and/or the layout 663 in which the window of third application APP3 is placed in a first region (e.g., first region 606a of the third layout 606 (e.g., left region) in FIG. 6A). The electronic device 201 may place the window of first application APP1 and the window of second application APP2 respectively in regions other than the region in which the window of third application APP3 is placed among the plural regions in the plural layouts 661 and 663 for display.

According to the above-described embodiments, based on the attributes of plural applications and the state (e.g., landscape mode) of the electronic device 201, the electronic device 201 may place the windows of the applications respectively in plural divided regions of a recommended layout, and provide the user with plural recommended layouts 611, 613, 615, 621, 623, 625, 631, 633, 635, 641, 651, 653, 661, 663 in which the windows of the plural applications APP1, APP2 and APP3 are differently arranged. As a plurality of recommended layouts in which plural windows are arranged in an optimized manner based on the attributes of the applications and the state of the electronic device 201 are provided, the user can easily change the layout, and the usability of each application can also be improved.

Figure 7:
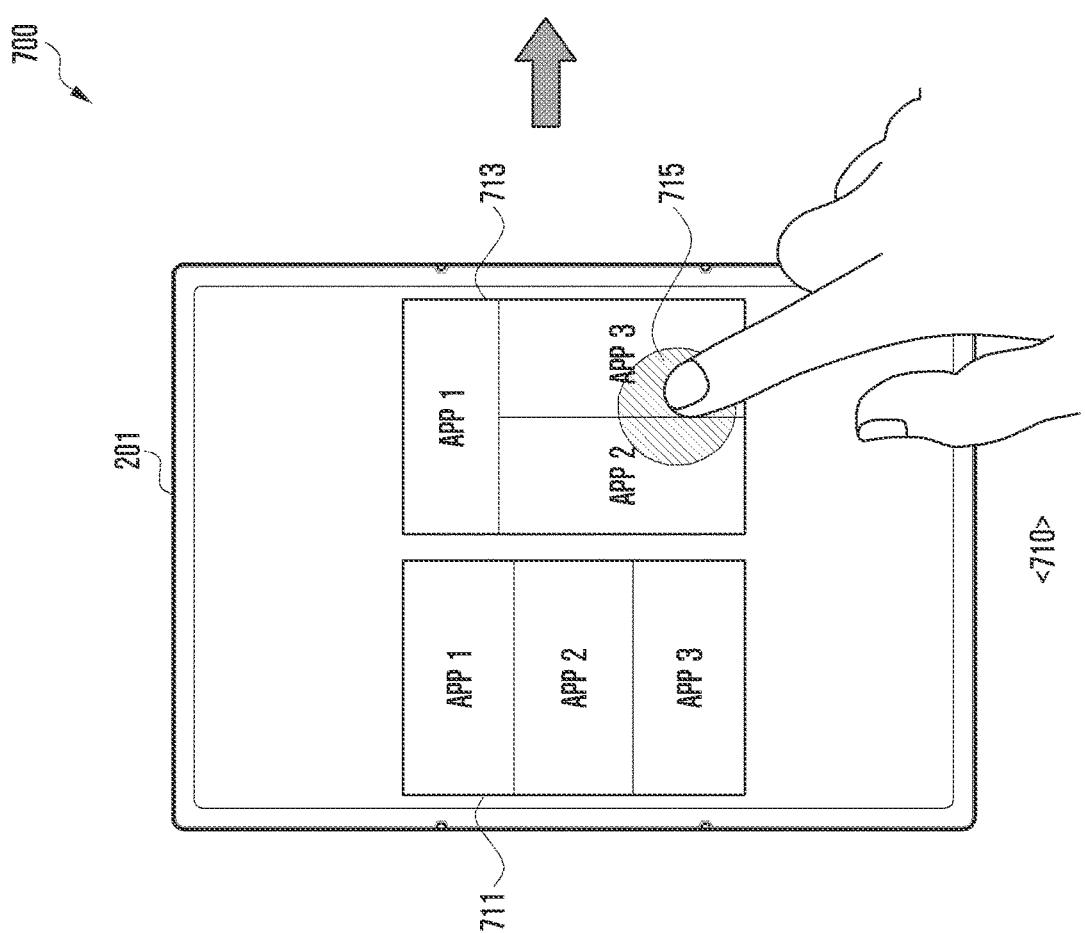
FIG. 7 is a diagram for depicting a method of displaying a plurality of windows to which a recommended layout selected from among multiple recommended layouts is applied according to an embodiment of the disclosure.

FIG. 7 is a diagram for depicting a method of displaying a plurality of windows to which a recommended layout selected from among multiple recommended layouts is applied according to an embodiment of the disclosure.

Referring to FIG. 7, depicting diagram 700, as shown by indicia 710, an electronic device (e.g., electronic device 201 in FIG. 2) may display, on the display (e.g., display 231 in FIG. 2), plural recommended layouts, for example, a first layout 711 and a second layout 713 in which plural windows are arranged differently based on the attributes of each application and the state of the electronic device 201 (e.g., orientation of the electronic device 201). When an input 715 for selecting the second layout 713 among the first layout 711 and the second layout 713 displayed on the display 231 is detected, as shown by indicia 720, the electronic device 201 may display the window of first application APP1, the window of second application APP2, and the window of third application APP3, to which the selected second layout 713 is applied, on the display 231.

Figure 8:
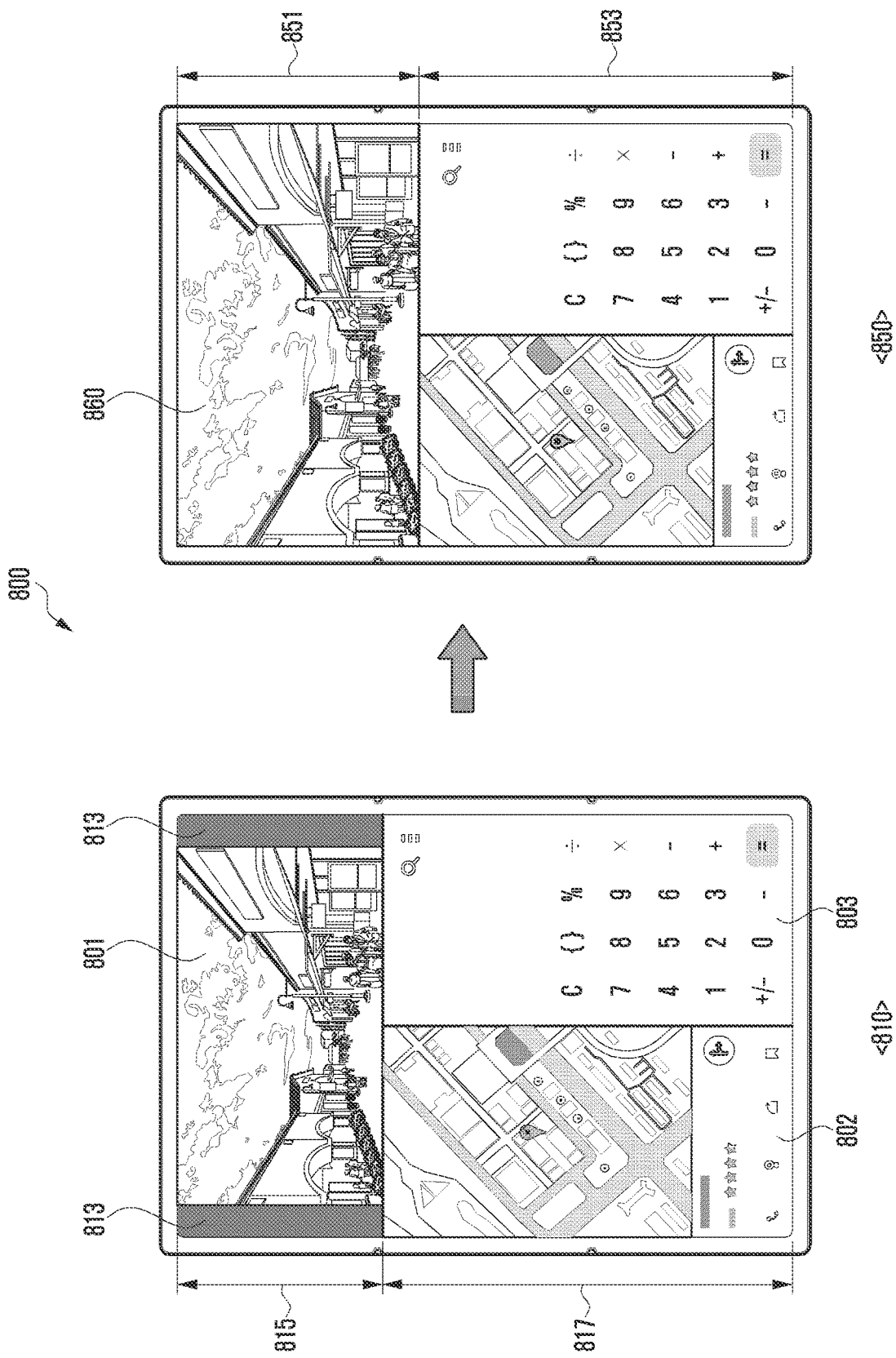
FIG. 8 is a diagram for depicting a method of displaying application windows in regions of the layout in optimized proportions according to an embodiment of the disclosure.

FIG. 8 is a diagram for depicting a method of displaying application windows in regions of the layout in optimized proportions according to an embodiment of the disclosure.

In the embodiment according to FIG. 8 depicting diagram 800, it is assumed for description that a first application is a video application including content optimized for viewing such as multimedia, a second application is a map application, and a third application is a calculator application.

Referring to FIG. 8, based on the selected second layout 713 as shown above by indicia 720 in FIG. 7, the electronic device (e.g., electronic device 201 in FIG. 2) may display window 801 of the video application, window 802 of the map application, and window 803 of the calculator application on the display (e.g., display 231 in FIG. 2).

In one embodiment, when displaying the selected layout on the display 231, as shown by indicia 810, the electronic device 201 may display the window 801 of the video application in a first region (e.g., first region 504a of the second layout 504 in FIG. 5A) based on the proportions (e.g., horizontal proportion and vertical proportion) configured in the window of the video application. When the proportions (e.g., horizontal proportion and vertical proportion) configured in the window of the video application are different from the proportions (e.g., horizontal proportion and vertical proportion) of the first region 504a, a black mark (BM) region 813 may be displayed.

In one embodiment, so as not to display the BM region 813, as shown by indicia 850, the electronic device 201 may adjust, for example, expand the size of the first region 504a in which the window 801 of the video application is placed in correspondence to the proportions configured in the window 801 of the video application. As the size of the first region 504a is expanded in correspondence to the proportions configured in the window 801 of the video application, the vertical proportion 851 of the first region 504a indicated by indicia 850 may be longer than the vertical proportion 815 of the first region 504a indicated by indicia 810. As the size of the first region 504a is expanded in correspondence to the proportions configured in the window 801 of the video application, the vertical proportion 853 of the second region (e.g., second layout 504 of the second layout 504 in FIG. 5A) and the third region (e.g., third region 504c of the second layout 504 in FIG. 5A) indicated by indicia 850 may be shorter than the vertical proportion 817 of the second region 504b and the third region 504c indicated by indicia 810. As the size of the first region 504a is expanded in correspondence to the proportions configured in the window 801 of the video application, the window 801 of the video application may be arranged in correspondence to the first region 504a (860), so that the user can watch an optimized video.

FIGS. 9A, 9B, 9C, and 9D are diagrams for depicting the folding states (e.g., unfolded state, folded state, and intermediate state) of the electronic device 201 according to various embodiments of the disclosure.

Referring to FIGS. 9A to 9D depicting diagram 900, an electronic device (e.g., electronic device 201 in FIG. 2) according to various embodiments may include a foldable device. The electronic device 201 may include a foldable housing 910 capable of being foldable. The foldable housing 910 may include a pair of housing structures, for example, a first housing structure 911 and a second housing structure 913 that are rotatably coupled to be folded each other about a folding axis 920 through a hinge structure (not shown). The first housing structure 911 and the second housing structure 913 may be disposed on both sides of the folding axis 920, and may have an overall symmetrical shape with respect to the folding axis 920.

In one embodiment, the angle or distance between the first housing structure 911 and the second housing structure 913 may be different according to the folding state of the electronic device 201, for example, unfolded state (flat state or open state), folded state (closed state), or intermediate state.

Figure 9A:
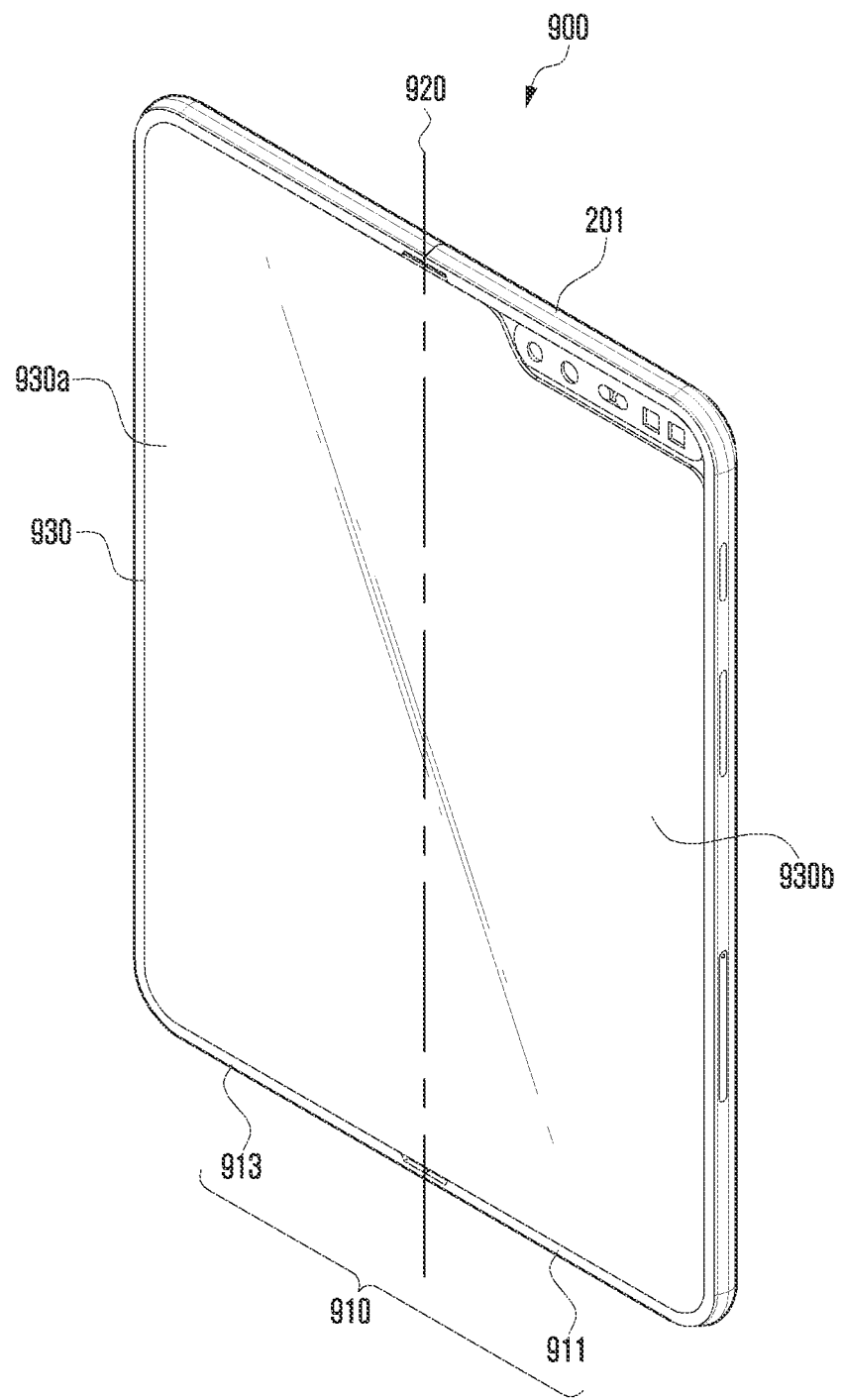
FIGS. 9A, 9B, 9C, and 9D are diagrams for depicting the folding states (e.g., unfolded state, folded state, and intermediate state) of the electronic device 201 according to various embodiments of the disclosure.
Figure 9B:
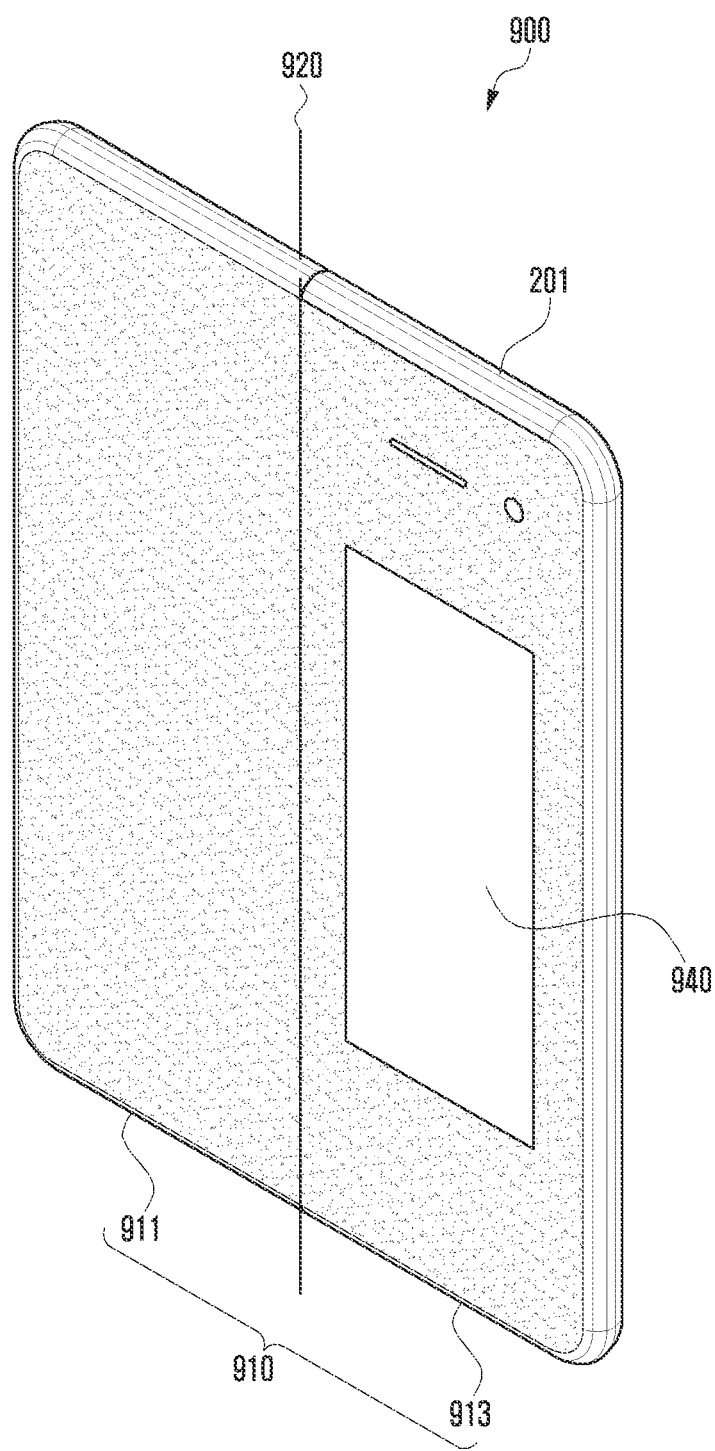

Referring to FIGS. 9A and 9B, according to an embodiment, a first housing structure 911 and a second housing structure 913 of an electronic device 201 may form an angle of 180 degrees. When the first housing structure 911 and the second housing structure 913 form an angle of 180 degrees, the electronic device 201 may be defined to be in an unfolded state. When the electronic device 201 is in an unfolded state, the first housing structure 911 and the second housing structure 913 may form a substantially planar structure.

In one embodiment, the electronic device 201 may include a first display 930 (e.g., flexible display or foldable display) disposed in a space formed by the pair of housing structures 911 and 913. When the electronic device 201 is in the unfolded state, as shown in FIG. 9A, the first region 930a and the second region 930b of the first display 930 may be disposed to face in the same direction.

In one embodiment, as shown in FIG. 9B, the electronic device 201 may further include a second display 940 (e.g., sub-display).

Figure 9C:
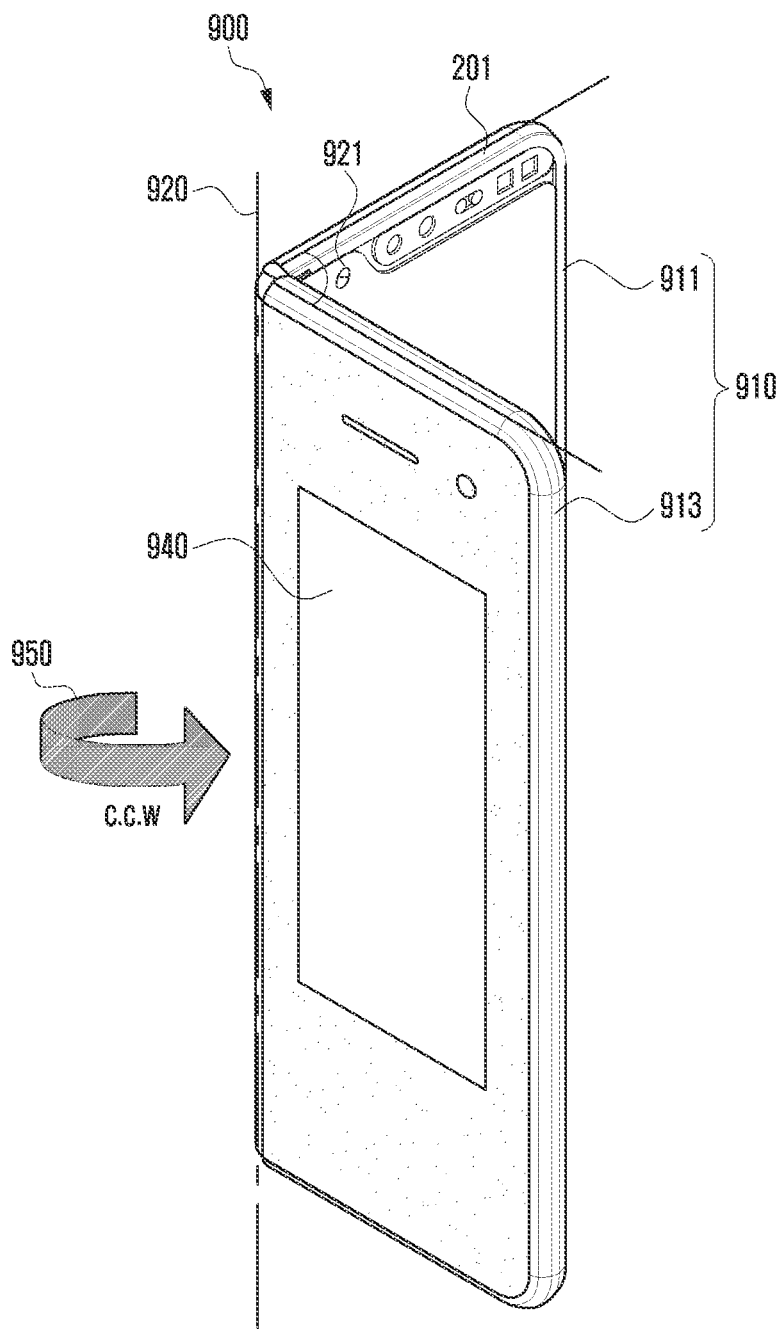

FIG. 9C is a diagram in which an electronic device 201 is partially folded in a counterclockwise direction 950 with respect to a folding axis 920 according to an embodiment. For example, as the electronic device 201 is folded with respect to the folding axis 920, the electronic device 201 may be in an intermediate state in which the first housing structure 911 and the second housing structure 913 form a specific angle 921 (e.g., 0). In one embodiment, the specific angle 921 (e.g., 0) may be sensed based on the movement of the hinge structure (not shown) through a sensor circuit, for example, a Hall sensor. The first region 930a and the second region 930b of the first display 930 may form an angle larger than that of the folded state (e.g., FIG. 9D) and smaller than that of the unfolded state (e.g., FIGS. 9A and 9B).

Figure 9D:
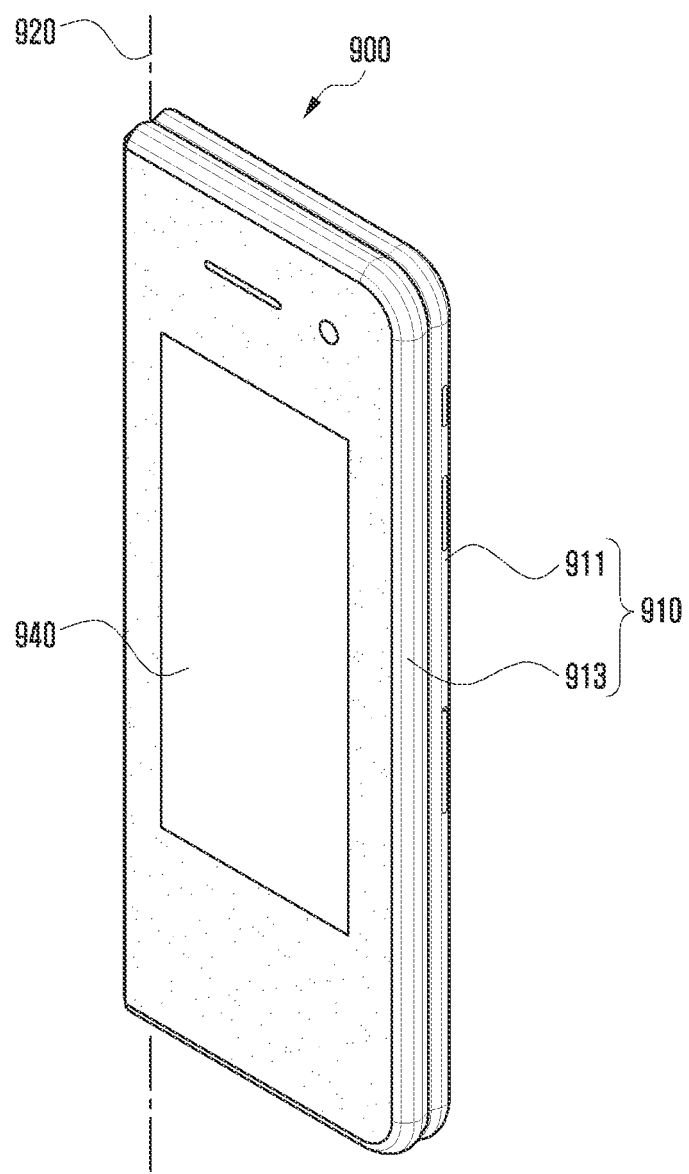

FIG. 9D is a diagram in which an electronic device 201 is maximally folded about a folding axis 920 (e.g., folded state) according to an embodiment.

Referring to FIG. 9D, when an electronic device 201 is in a folded state, a first housing structure 911 and a second housing structure 913 may be disposed to face each other. The first region 930a and the second region 930b of the first display 930 may form a narrow angle (e.g., between 0 and 10 degrees) and may face each other.

Figure 10A:
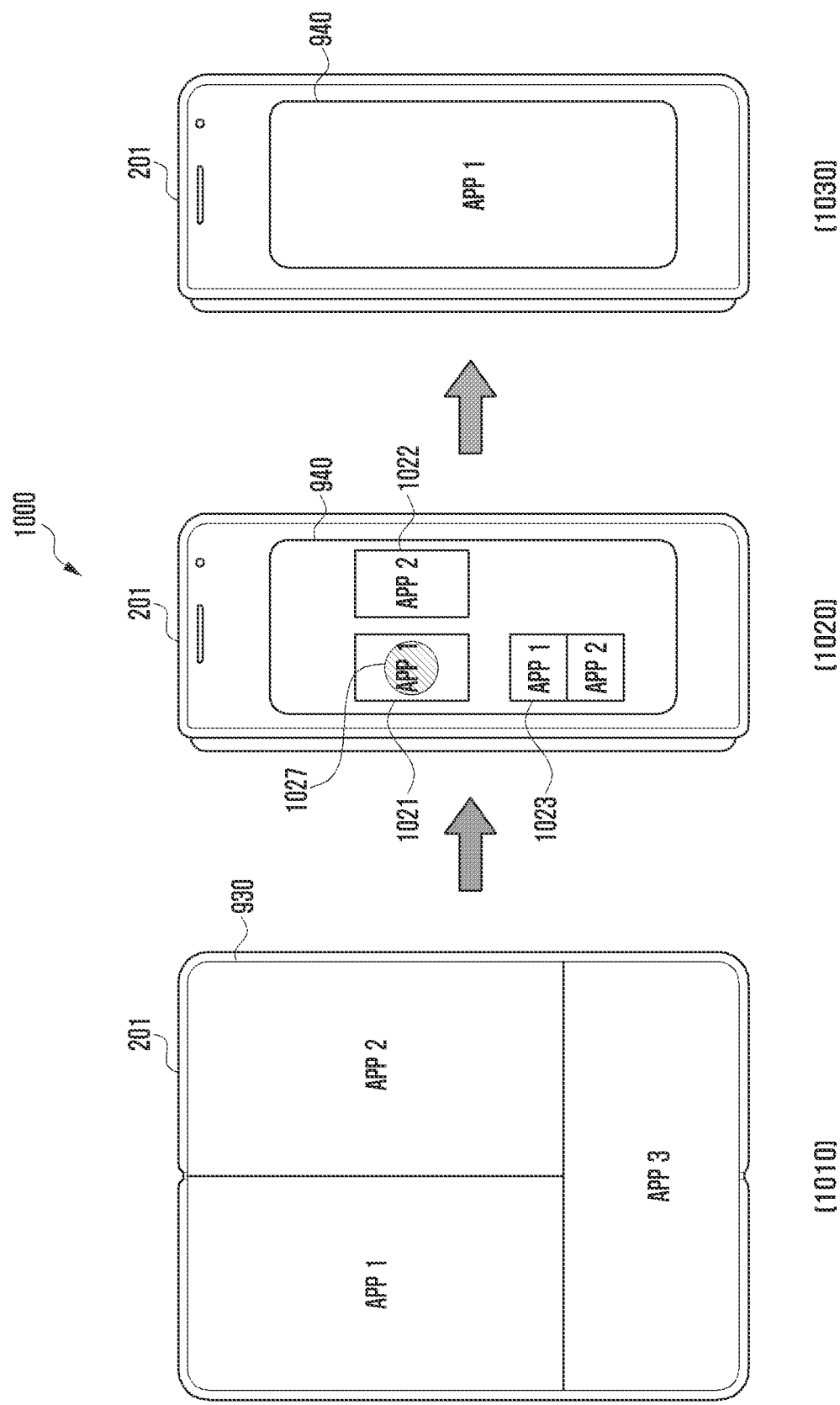
FIGS. 10A and 10B are diagrams for depicting a method of determining applications to be arranged in plural regions of the recommended layout based on attributes of multiple applications and states of the electronic device in response to detecting a layout change event according to various embodiments of the disclosure.
Figure 10B:
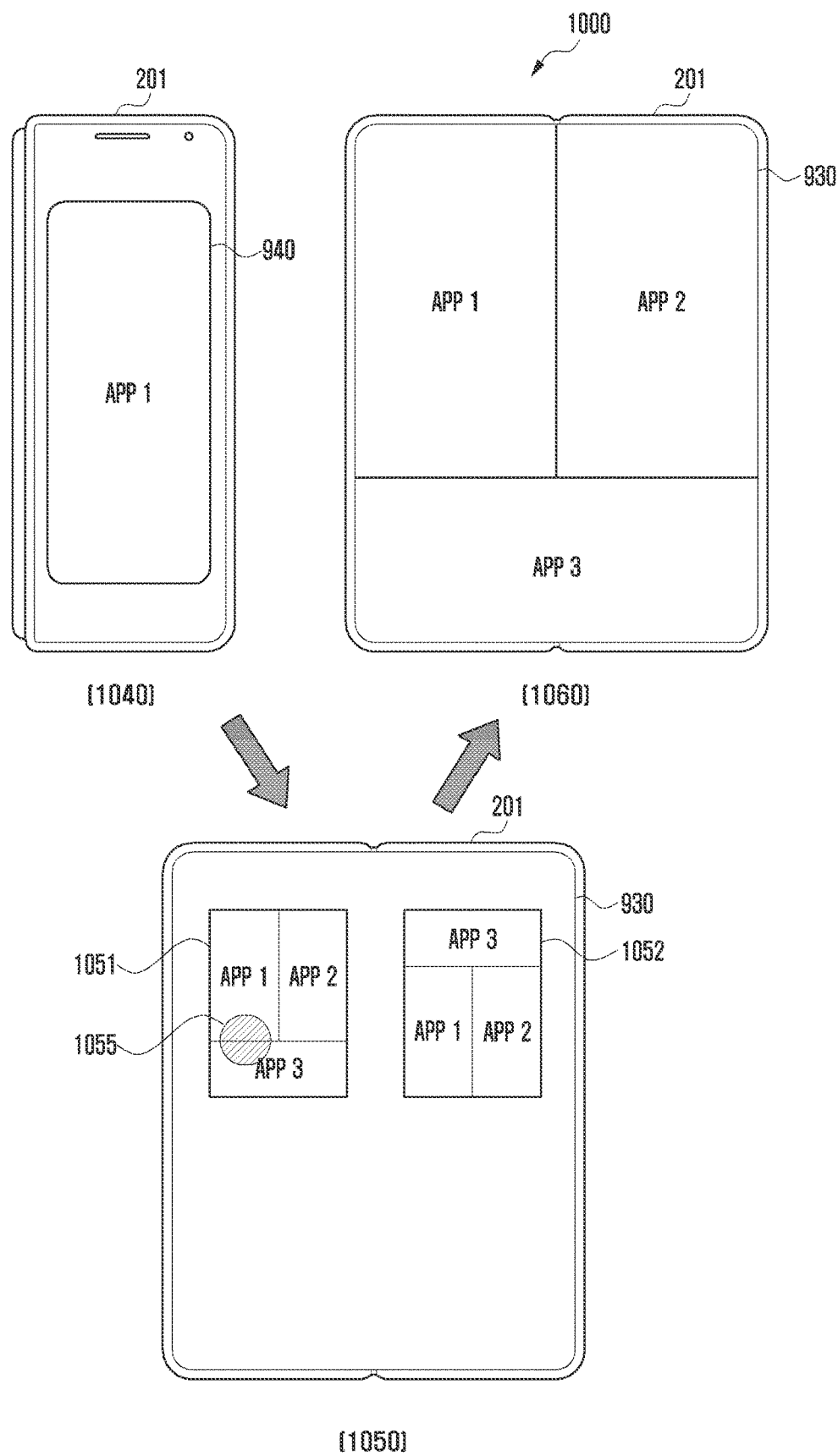

FIGS. 10A and 10B are diagrams for depicting a method of determining applications to be arranged in plural regions of the recommended layout based on attributes of multiple applications and states of the electronic device in response to detecting a layout change event according to various embodiments of the disclosure.

In one embodiment, while displaying a screen composed of plural windows corresponding to plural applications on the first display 930 in portrait mode, the electronic device (e.g., electronic device 201 in FIG. 2) may detect a change in the folding state of the electronic device 201 (e.g., a change from the unfolded state to the folded state, or a change from the folded state to the unfolded state) through the sensor circuit (e.g., sensor circuit 240 in FIG. 2).

Referring to FIG. 10A depicting diagram 1000, when first application APP1, second application APP2, and third application APP3 are executed in the unfolded state of the electronic device 201 (e.g., FIGS. 9A and 9B), as shown by indicia 1010, the electronic device 201 may display the window of first application APP1, the window of second application APP2, and the window of third application APP3 on the first display 930 as a multi-window screen. The electronic device 201 in the unfolded state may detect a change in the folding state of the electronic device 201, for example, a change from the unfolded state to the closed state, through the sensor circuit 240.

In one embodiment, when the electronic device 201 is transitioned to the closed state (e.g., FIG. 9D) as shown by indicia 1020, the electronic device 201 may determine that an event for changing the layout is detected, and may display, on the second display 940, plural recommended layouts in which plural windows are differently arranged based on the attributes of the plural applications being executed (e.g., application supporting portrait mode, multimedia application, application that can use an input interface, priority of applications, or execution order of applications), the orientation of the electronic device 201, for example, portrait mode, and the folding state of the electronic device 201, for example, closed state.

In one embodiment, as the folding state of the electronic device 201 is changed from the unfolded state to the closed state, the display for displaying windows of plural applications may be switched from the first display 930 to the second display 940. For example, the size of the second display 940 of the electronic device 201 may be smaller than the size of the first display 930. When the display for displaying windows of plural applications is switched from the first display 930 to the second display 940, if the windows of plural applications having been displayed on the first display 930 are displayed on the second display 940, readability may deteriorate. When the folding state of the electronic device 201 is changed to the closed state, the electronic device 201 may display, on the second display 940, plural recommended layouts including at least one window among the windows of plural applications. For instance, the plurality of recommended layouts may include a layout 1021 including the window of first application, a layout 1022 including the window of second application, and/or a layout 1023 that is divided into two regions to include the window of first application and the window of second application. The plurality of recommended layouts that may be displayed as the electronic device 201 is changed to the closed state are not limited thereto. For example, the plurality of recommended layouts may include a layout that is divided into two regions to include the window of first application and the window of third application, and a layout that is divided into two regions to include the window of second application and the window of third application.

In one embodiment, when an input 1027 for selecting one recommended layout 1021 from among the plural recommended layouts 1021, 1022 and 1023 is detected, as shown by indicia 1030, the electronic device 201 may display at least one window to which the selected recommended layout 1021 is applied, for example, the window of first application APP1 on the second display 940.

Referring to FIG. 10B, while displaying a window of first application APP1 to which a recommended layout 1021 selected from among a plural recommended layouts 1021, 1022 and 1023 is applied on the second display 940 as shown by indicia 1040, an electronic device 201 may detect a change in the folding state of an electronic device 201, for example, a change from the closed state (e.g., FIG. 9D) to the unfolded state (e.g., FIGS. 9A and 9B) through the sensor circuit 240.

In one embodiment, when the electronic device 201 is transitioned to the unfolded state as shown by indicia 1050, the electronic device 201 may determine that an event for changing the layout is detected, and may display, on the first display 930, plural recommended layouts 1051 and 1052 in which at least one window among the plural windows is arranged differently based on the attributes of the plural applications being executed, the orientation of the electronic device 201, for example, portrait mode, and the folding state of the electronic device 201, for example, unfolded state.

According to various embodiments, the plural recommended layouts that may be displayed include the first layout 502, the second layout 504, and/or the third layout 506 in FIG. 5A corresponding to the layouts recommended when the electronic device 201 is in portrait mode described above. However, it is not limited thereto.

In one embodiment, when an input 1055 for selecting one recommended layout 1051 among the plural recommended layouts 1051 and 1052 is detected, as shown by indicia 1060, the electronic device 201 may display plural windows to which the selected recommended layout 1051 is applied on the first display 930.

Referring to FIG. 10B, according to an embodiment, it has been described that, in response to an input 1055 for selecting one recommended layout 1051 from among the plural recommended layouts, plural windows to which the selected recommended layout 1051 is applied are displayed on the first display 930, but it is not limited thereto. For example, in another embodiment, when the electronic device 201 is transitioned to the unfolded state, even if an input 1055 for selecting one recommended layout 1051 is not detected, the electronic device 201 may display a screen on which plural windows are arranged on the first display 930 by applying a previously configured layout, for example, in the form of the layout indicated by indicia 1010 in FIG. 10A.

Figure 11B:
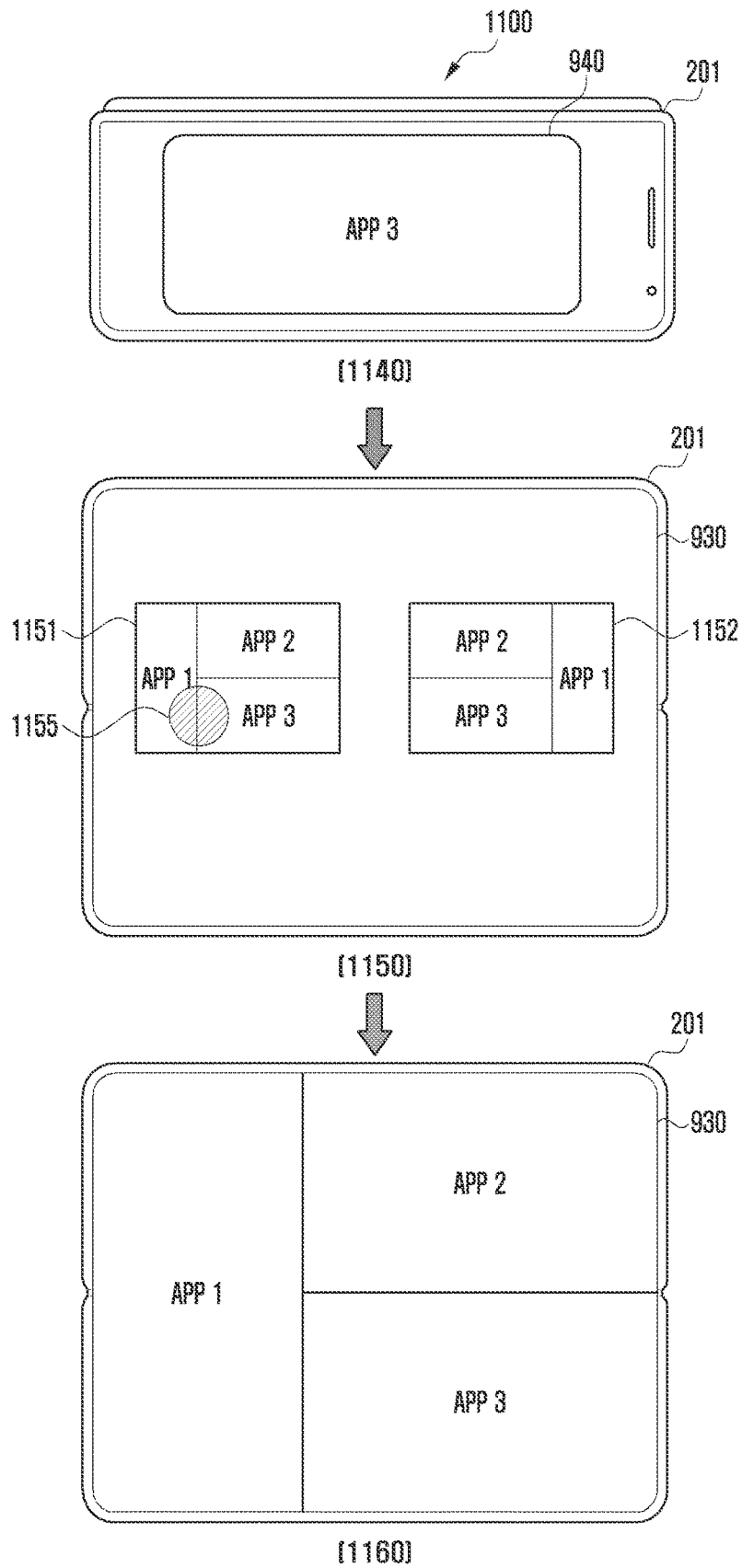

FIGS. 11A and 11B are diagrams for depicting a method of determining applications to be arranged in plural regions of the recommended layout based on attributes of multiple applications and states of the electronic device in response to detecting a layout change event according to various embodiments of the disclosure.

In one embodiment, while displaying a screen composed of plural windows corresponding to plural applications on the first display 930 in landscape mode, the electronic device (e.g., electronic device 201 in FIG. 2) may detect a change in the folding state of the electronic device 201 (e.g., change from unfolded state to folded state, or change from folded state to unfolded state) through the sensor circuit (e.g., sensor circuit 240 in FIG. 2).

For instance, with reference to FIG. 11A depicting diagram 1100, as an electronic device 201 in the unfolded state (e.g., FIGS. 9A and 9B) executes first application APP1, second application APP2, and third application APP3, as shown by indicia 1110, the electronic device 201 may display the window of first application APP1, the window of second application APP2, and the window of third application APP3 on the first display 930 as a multi-window screen. The electronic device 201 in the unfolded state may detect a change in the folding state of the electronic device 201, for example, a change from the unfolded state to the closed state through the sensor circuit 240.

In one embodiment, when the electronic device 201 is changed to the closed state (e.g., FIG. 9D) as shown by indicia 1120, the electronic device 201 may determine that an event for changing the layout is detected, and may display, on the second display 940, plural recommended layouts in which at least one window among the plural windows is differently arranged based on the attributes of the plural applications being executed (e.g., application supporting portrait mode, multimedia application, application that can use an input interface, high-priority application, or execution order of applications), the orientation of the electronic device 201, for example, landscape mode, and the folding state of the electronic device 201, for example, closed state. For example, the plural recommended layouts may include a layout 1121 including the window of second application, a layout 1122 including the window of third application, and/or a layout 1123 that is divided into two regions to include the window of second application and the window of third application. The plural recommended layouts that may be displayed as the electronic device 201 is changed to the closed state are not limited thereto.

In one embodiment, the window of at least one application arranged in each of the plural recommended layouts 1121, 1122 and 1123 may be determined based on at least one of the application supporting landscape mode, the application having a high priority, or the execution order of applications.

In one embodiment, when an input 1127 for selecting one recommended layout 1123 from among the plural recommended layouts 1121, 1122 and 1123 is detected, as shown by indicia 1130, the electronic device 201 may display at least one window to which the selected recommended layout 1123 is applied, for example, the window of third application APP3 on the second display 940.

Referring to FIG. 11B depicting diagram 1100, while displaying the window of third application APP3 to which a recommended layout 1123 selected from among the plural recommended layouts 1121, 1122 and 1123 is applied on the second display 940 as shown by indicia 1140, the electronic device 201 may detect a change in the folding state of the electronic device 201, for example, a change from the closed state to the unfolded state through the sensor circuit 240.

In one embodiment, when the electronic device 201 is transitioned to the unfolded state as shown by indicia 1150, the electronic device 201 may determine that an event for changing the layout is detected, and may display, on the first display 930, plural recommended layouts 1151 and 1152 in which at least one window among the plural windows is arranged differently based on the attributes of the plural applications being executed, the orientation of the electronic device 201, for example, landscape mode, and the folding state of the electronic device 201, for example, unfolded state. For example, the recommended layouts that may be recommended may include the first layout 502, the second layout 504, and/or the third layout 506 described above in FIG. 5A.

According to various embodiments, the plural recommended layouts that may be displayed include the first layout 602, the second layout 604, and/or the third layout 606 in FIG. 6A corresponding to the layouts recommended when the electronic device 201 is in landscape mode described above. However, it is not limited thereto.

In one embodiment, when an input 1155 for selecting one recommended layout 1151 from among the plural recommended layouts 1151 and 1152 is detected, as shown by indicia 1160, the electronic device 201 may display plural windows to which the selected recommended layout 1151 is applied on the first display 930.

Referring to FIG. 11B, according to an embodiment, it has been described that, in response to an input 1155 for selecting one recommended layout 1151 from among the plural recommended layouts, plural windows to which the selected recommended layout 1151 is applied are displayed on the first display 930, but it is not limited thereto. For example, in another embodiment, when the electronic device 201 is transitioned to the unfolded state, even if an input 1155 for selecting one recommended layout 1151 is not detected, the electronic device 201 may display a screen on which plural windows are arranged on the first display 930 by applying a previously configured layout, for example, in the form of the layout indicated by indicia 1110 in FIG. 11A.

Figure 12A:
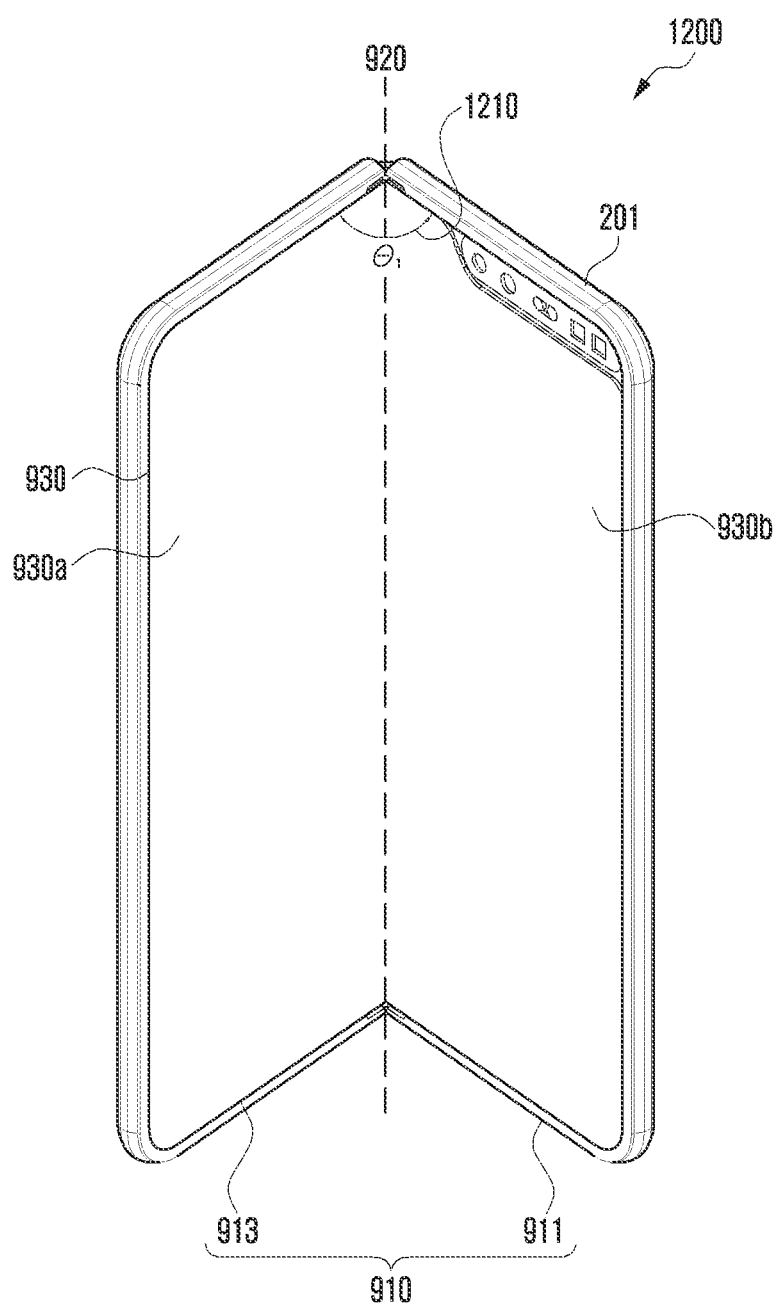
FIGS. 12A and 12B are diagrams for depicting a method of displaying a plurality of different recommended layouts based on the state of the electronic device being unfolded at a specific angle according to various embodiments of the disclosure.
Figure 12B:
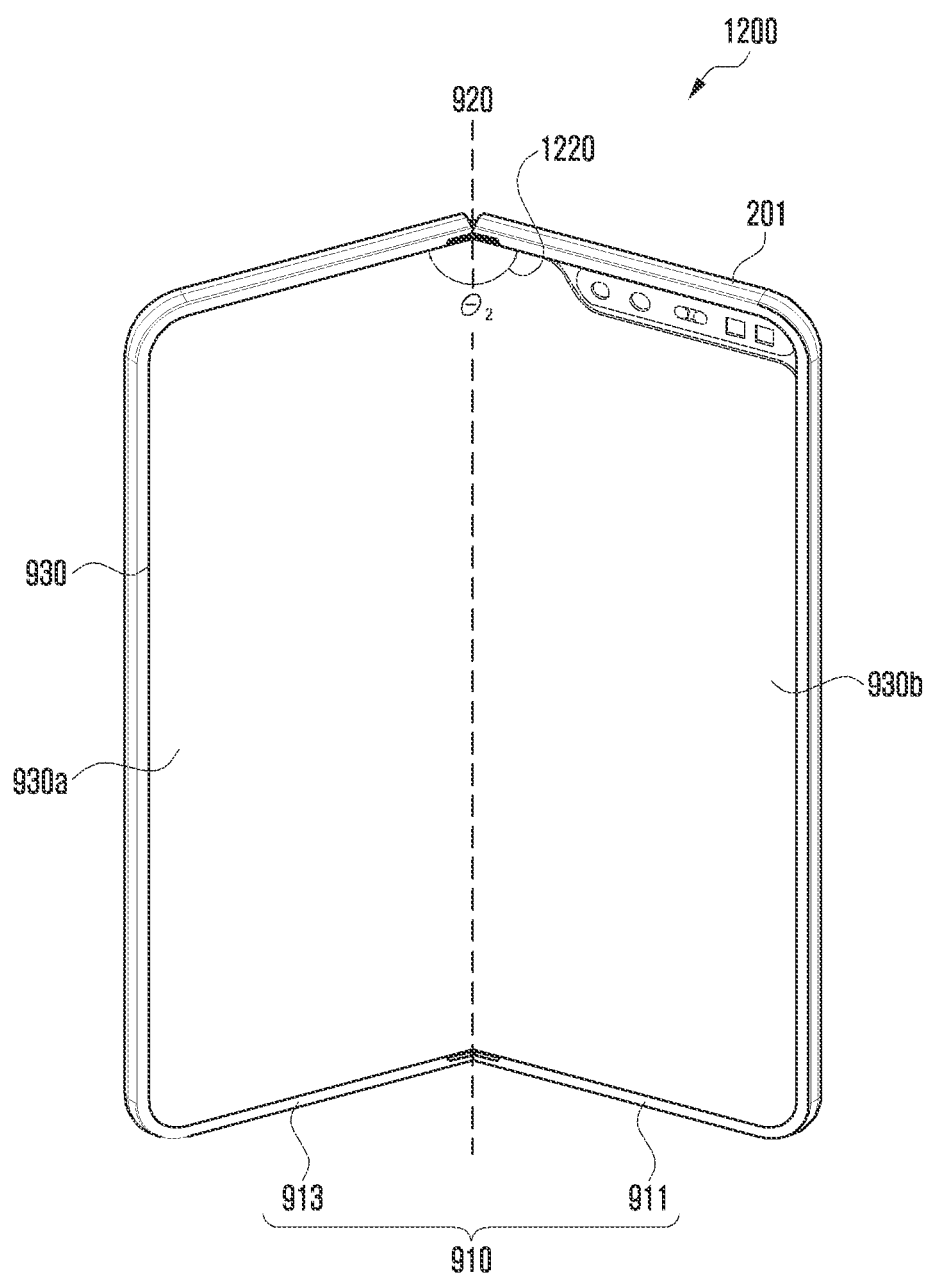

FIGS. 12A and 12B are diagrams for depicting a method of displaying a plurality of different recommended layouts based on the state of the electronic device being unfolded at a specific angle according to various embodiments of the disclosure.

Referring to FIGS. 12A and 12B depicting diagrams 1200, an electronic device (e.g., electronic device 201 in FIG. 2) may detect a change from the unfolded state (e.g., FIGS. 9A and 9B) to the unfolded state with a specific angle. When the electronic device 201 is transitioned to the unfolded state with a specific angle, the electronic device 201 may detect a specific angle formed by the first housing structure 911 and the second housing structure 913 through the sensor circuit (e.g., sensor circuit 240 in FIG. 2).

In one embodiment, the electronic device 201 may determine whether the detected specific angle is included in a specified angular range. For example, the specified angular range may include a first specified angular range and a second specified angular range. According to an embodiment, it is assumed for description that the first specified angular range is between 0 degrees and 90 degrees, and the second specified angular range is above 90 degrees. The numerical values of the angular range described above are for facilitating the description of providing plural different recommended layouts based on the angular ranges according to various embodiments, and are not limited to those numerical values described above.

In one embodiment, while displaying a screen composed of plural windows corresponding to plural applications on the first display 930, the electronic device 201 may detect an intermediate state in which the first housing structure 911 and the second housing structure 913 of the electronic device 201 form a specific angle through the sensor circuit 240.

In one embodiment, the electronic device 201 may propose plural recommended layouts in which windows of plural applications to be displayed on the display are differently arranged based on the detected specific angle.

Referring to FIG. 12A, an electronic device 201 may detect an unfolded state with an angle (e.g., 01 (1210)) belonging to the first specified angular range (e.g., between 0 degrees and 90 degrees). In response to detecting the unfolded state with an angle (e.g., 01 (1210)) belonging to the first specified angular range, the electronic device 201 may display plural recommended layouts corresponding to the first specified angular range on the first display 930. For example, the plural recommended layouts corresponding to the first specified angular range may include the plural recommended layouts 1021, 1022 and 1023 according to the embodiment of FIG. 10A described above, or the plural recommended layouts 1121, 1122 and 1123 according to the embodiment of FIG. 11A.

In one embodiment, the state in which the electronic device 201 is unfolded at an angle belonging to the first specified angular range may be determined as the user's intention to use only one of the first region 930a and the second region 930b of the first display 930. Upon determining that the electronic device 201 is unfolded at an angle belonging to the first designated angular range, the electronic device 201 may turn on the second region 930b (or, first region 930a) of the first display 930 to display plural recommended layouts, and may turn off the first region 930a (or, second region 930b). Based on the plural recommended layouts 1021, 1022 and 1023 according to the embodiment of FIG. 10A or the plural recommended layouts 1121, 1122 and 1123 according to the embodiment of FIG. 11A, at least one window to which the selected layout is applied may be displayed in the second region 930b of on-state.

In one embodiment, although not shown, when the electronic device 201 is transitioned from an unfolded state with a specific angle, for example, an angle belonging to the first specified angular range to the closed state, the electronic device 201 may transfer the at least one window having been displayed on the second region 930b of on-state to display it on the second display 940. As the display area is switched from the second region 930b to the second display 940, at least one window may be displayed in correspondence to the size of the second display 940.

In one embodiment, although not shown, when the electronic device 201 is transitioned from an unfolded state with a specific angle, for example, an angle (e.g., 01 (1210)) belonging to the first specified angular range to the unfolded state, the electronic device 201 may display, on the display, the plural recommended layouts 1051 and 1052 according to the embodiment of FIG. 10B described above, or the plural recommended layouts 1151 and 1152 according to the embodiment of FIG. 11B.

Referring to FIG. 12B, an electronic device 201 may be in an unfolded state with an angle (e.g., 02 (1220)) belonging to the second specified angular range (e.g., angle exceeding 90 degrees). In response to detecting a state in which the electronic device 201 is unfolded at an angle (e.g., 02 (1220)) belonging to the second specified angular range, the electronic device 201 may provide the first display 930 with plural recommended layouts corresponding to the second specified angular range. For example, the plural recommended layouts corresponding to the second specified angular range may include the plural recommended layouts 1051 and 1052 according to the embodiment of FIG. 10B or the plural recommended layouts 1151 and 1152 according to the embodiment of FIG. 11B described above.

In one embodiment, although not shown, when the electronic device 201 is transitioned from an unfolded state with a specific angle, for example, an angle (e.g., 02 (1220)) belonging to the second specified angular range to the closed state, the electronic device 201 may display the plural recommended layouts 1021, 1022 and 1023 according to the embodiment of FIG. 10A or the plural recommended layouts 1121, 1122 and 1123 according to the embodiment of FIG. 11A described above.

In one embodiment, although not shown, when the electronic device 201 is transitioned from an unfolded state with a specific angle, for example, an angle (e.g., 02 (1220)) belonging to the second specified angular range to the unfolded state, the electronic device 201 may maintain display of plural windows based on the layout being displayed on the first display 930.

According to various embodiments, as the electronic device 201 is transitioned from the unfolded state (e.g., FIGS. 9A and 9B) to an unfolded state with a specific angle, at least one application placed in an optimized way in at least one of the first region 930a or the second region 930b of the first display 930 can be easily utilized.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a processor operatively connected to the display; and
    memory storing instructions that, when executed by the processor, cause the electronic device to:
        display a screen including a plurality of windows, each of the windows corresponding to each of a plurality of applications executed by the electronic device,
        detect an event for changing a layout of the plurality of windows,
        display, in response to detecting the event, a plurality of layouts, wherein each of the plurality of layouts includes a plurality of regions divided based on a quantity of the executed plurality of applications, an arrangement of the plurality of divided regions included in each of the plurality of layouts is configured to be different from each other, and the plurality of windows are disposed at the plurality of divided regions of each of the plurality of layouts based on an attribute of each of the executed plurality of applications, an orientation of the electronic device, and a folding state of the electronic device, and wherein the plurality of layouts are displayed in an order of a number of times each of the plurality of layouts has been selected by a user,
        display, in response to one of the plurality of layouts being selected, the plurality of windows based on the selected layout, and
        adjust, based on proportions of a plurality of divided regions of the selected layout and proportions of the plurality of the windows disposed at the plurality of divided regions of the selected layout, at least one of the plurality of divided regions of the selected layout.

2. The electronic device of claim 1, wherein the instructions, when executed by the processor, cause the electronic device to:
    determine the plurality of windows to be disposed at the plurality of divided regions of each of the plurality of layouts based on the attribute of each of the executed plurality of applications, the orientation of the electronic device, and the folding state of the electronic device.

3. The electronic device of claim 1,
    wherein the attribute of each of the executed plurality of applications includes at least one of whether an application supports landscape mode, whether the application is a multimedia application, a priority of the application, an execution order of the application, or whether the application uses an input interface,
    wherein the orientation of the electronic device includes one of a landscape orientation or portrait orientation, and
    wherein the folding state of the electronic device includes one of an unfolded state, a folded state, or an intermediate state.

4. The electronic device of claim 1, wherein the instructions, when executed by the processor, cause the electronic device to:
    record the number of times each of the plurality of layouts has been selected in the memory.

5. The electronic device of claim 3, further comprising:
    a sensor circuit,
    wherein the event for changing the layout of the plurality of windows includes at least one of rotation of the electronic device detected through the sensor circuit, a change in the folding state of the electronic device detected through the sensor circuit, or a specified input detected on the display.

6. The electronic device of claim 5,
wherein the rotation of the electronic device includes a transition in the orientation of the electronic device,
wherein the transition in the orientation includes one of a first transition that is from the portrait orientation to the landscape orientation, or a second transition that is from the landscape orientation to the portrait orientation, and
wherein the change in the folding state of the electronic device includes one of a first change that is from the unfolded state to the folded state or the intermediate state, a second change that is from the folded state to the unfolded state or the intermediate state, or a third change that is from the intermediate state to the unfolded state or the folded state.

7. The electronic device of claim 1, wherein a shape of at least one of the plurality of divided regions included in each of the plurality of layouts is configured to be different from each other.

8. The electronic device of claim 5, further comprising:
a housing structure,
wherein the housing structure includes a first housing structure and a second housing structure, and
wherein the instructions, when executed by the processor, cause the electronic device to:
detect a specific angle formed between the first housing structure and the second housing structure through the sensor circuit, and
display the plurality of layouts based on the detected specific angle.

9. The electronic device of claim 1,
wherein the instructions, when executed by the processor, cause the electronic device to:
determine the plurality of windows to be disposed at the plurality of divided regions of each of the plurality of layouts based on the attribute of each of the executed plurality of applications, the orientation of the electronic device, the folding state of the electronic device, and at least one of priority information set for each of the executed plurality of applications or history information of each of the executed plurality of applications, and
wherein, in the displayed plurality of layouts, the plurality of windows are disposed at the plurality of divided regions of each of the plurality of layouts based on the attribute of each of the executed plurality of applications, the orientation of the electronic device, the folding state of the electronic device, and the at least one of the priority information set for each of the executed plurality of applications or the history information of each of the executed plurality of applications.

10. A method performed by an electronic device, the method comprising:
displaying a screen including a plurality of windows, each of the windows corresponding to each of a plurality of applications executed by the electronic device;
detecting an event for changing a layout of the plurality of windows;
displaying, in response to detecting the event, a plurality of layouts, wherein each of the plurality of layouts includes a plurality of regions divided based on a quantity of the executed plurality of applications, an arrangement of the plurality of divided regions included in each of the plurality of layouts is configured to be different from each other, and the plurality of windows are disposed at the plurality of divided regions of each of the plurality of layouts based on an attribute of each of the executed plurality of applications, an orientation of the electronic device, and a folding state of the electronic device, and wherein the plurality of layouts are displayed in an order of a number of times each of the plurality of layouts has been selected by a user;
displaying, in response to one of the plurality of layouts being selected, the plurality of windows based on the selected layout; and
adjusting, based on proportions of a plurality of divided regions of the selected layout and proportions of the plurality of the windows disposed at the plurality of divided regions of the selected layout, at least one of the plurality of divided regions of the selected layout.

11. The method of claim 10, wherein the displaying of the plurality of layouts comprises:
determining the plurality of windows to be disposed at the plurality of divided regions of each of the plurality of layouts based on the attribute of each of the executed plurality of applications, the orientation of the electronic device, and the folding state of the electronic device.

12. The method of claim 10,
wherein the attribute of each of the executed plurality of applications includes at least one of whether an application supports landscape mode, whether the application is a multimedia application, a priority of the application, an execution order of the application, or whether the application uses an input interface,
wherein the orientation of the electronic device includes one of a landscape orientation or a portrait orientation, and
wherein the folding state of the electronic device includes one of an unfolded state, a folded state, or an intermediate state.

13. The method of claim 12,
wherein the detecting of the event for changing the layout of the plurality of windows comprises detecting at least one of rotation of the electronic device through a sensor circuit, a change in the folding state of the electronic device through the sensor circuit, or a specified input on a display,
wherein the rotation of the electronic device includes a transition in the orientation of the electronic device,
wherein the transition in the orientation includes one of a first transition that is from the portrait orientation to the landscape orientation, or a second transition that is from the landscape orientation to the portrait orientation, and
wherein the change in the folding state of the electronic device includes one of a first change that is from the unfolded state to the folded state or the intermediate state, a second change that is from the folded state to the unfolded state or the intermediate state, or a third change that is from the intermediate state to the unfolded state or the folded state.

14. The method of claim 10, wherein the displaying of the plurality of layouts comprises:
detecting a specific angle formed between a first housing structure and a second housing structure included in the electronic device through a sensor circuit; and
displaying the plurality of layouts based on the detected specific angle.

15. The method of claim 13, wherein the specified input comprises a pinch gesture at a first boundary between a first window and a second window, and at a second boundary between the second window and a third window.

16. The method of claim 10,
wherein the displaying of the plurality of layouts comprises:
   determining the plurality of windows to be disposed at the plurality of divided regions of each of the plurality of layouts based on the attribute of each of the executed plurality of applications, the orientation of the electronic device, the folding state of the electronic device, and at least one of priority information set for each of the executed plurality of applications or history information of each of the executed plurality of applications, and
wherein, in the displayed plurality of layouts, the plurality of windows are disposed at the plurality of divided regions of each of the plurality of layouts based on the attribute of each of the executed plurality of applications, the orientation of the electronic device, the folding state of the electronic device, and the at least one of the priority information set for each of the executed plurality of applications or the history information of each of the executed plurality of applications.

* * * * *